(12) United States Patent
Noro

(10) Patent No.: US 11,481,588 B2
(45) Date of Patent: Oct. 25, 2022

(54) IMAGE FORMING APPARATUS

(71) Applicant: CANON KABUSHIKI KAISHA, Tokyo (JP)

(72) Inventor: Toshitaka Noro, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/132,968

(22) Filed: Dec. 23, 2020

(65) Prior Publication Data

US 2021/0117739 A1     Apr. 22, 2021

Related U.S. Application Data

(63) Continuation of application No. PCT/JP2019/025416, filed on Jun. 26, 2019.

(30) Foreign Application Priority Data

Jun. 27, 2018   (JP) .............................. JP2018-121820

(51) Int. Cl.
    *G06K 15/12*     (2006.01)
    *G03G 15/01*     (2006.01)
    *G03G 15/00*     (2006.01)

(52) U.S. Cl.
    CPC ......... *G06K 15/1219* (2013.01); *G03G 15/01* (2013.01); *G03G 15/6564* (2013.01); *G06K 15/129* (2013.01); *G06K 15/1223* (2013.01)

(58) Field of Classification Search
    CPC .................. G06K 15/1219; G06K 15/1223
    See application file for complete search history.

(56) References Cited

U.S. PATENT DOCUMENTS 6,476,845 B2    11/2002  Luman
7,248,277 B2 *   7/2007  Ishikawa .................. B41J 2/45
                                                347/237

(Continued)

FOREIGN PATENT DOCUMENTS

JP    2002-254699 A    9/2002
JP    2007-098772 A    4/2007

(Continued)

OTHER PUBLICATIONS

International Preliminary Report on Patentability dated Jan. 7, 2021, in International Application No. PCT/JP2019/025416.

(Continued)

*Primary Examiner* — Ted W Barnes
(74) *Attorney, Agent, or Firm* — Venable LLP

(57) ABSTRACT

An image forming apparatus configured to perform high-quality image formation regardless of an accuracy of mounting surface emitting element array chips includes an image data generating portion configured to generate pixel data equivalent to 2,400 dpi; a joint correcting portion configured to correct a misregistration amount at a joint between a predetermined surface emitting element array chip and a surface emitting element array chip arranged adjacent to the predetermined surface emitting element array chip; and a resolution converting portion configured to convert a resolution of the pixel data from 2,400 dpi to 1,200 dpi. The joint correcting portion is configured to correct the misregistration amount at the joint with respect to pixel data obtained after the resolution thereof is converted by the resolution converting portion.

13 Claims, 20 Drawing Sheets

(56) References Cited

U.S. PATENT DOCUMENTS

| | | | |
|---|---|---|---|
| 8,482,588 B2 | 7/2013 | Miyadera et al. | |
| 9,904,206 B2 | 2/2018 | Horiuchi et al. | |
| 2005/0117133 A1* | 6/2005 | Ishikawa | G06K 15/1261 355/18 |
| 2019/0155184 A1* | 5/2019 | Suzuki | H04N 1/0473 |
| 2019/0384205 A1* | 12/2019 | Furuta | G03G 15/043 |
| 2020/0004173 A1* | 1/2020 | Yoshida | G03G 15/043 |
| 2020/0166863 A1* | 5/2020 | Noro | G03G 15/04054 |
| 2020/0225600 A1* | 7/2020 | Seki | G03G 21/20 |

FOREIGN PATENT DOCUMENTS

| | | | | |
|---|---|---|---|---|
| JP | 2007098772 A | * | 4/2007 | |
| JP | 4344585 B2 | | 10/2009 | |
| JP | 5691330 B2 | * | 4/2015 | G03G 15/043 |
| JP | 5691330 B2 | | 4/2015 | |
| JP | 2017-094594 A | | 6/2017 | |

OTHER PUBLICATIONS

International Search Report and Written Opinion dated Aug. 20, 2019, in International Application No. PCT/JP2019/025416.

* cited by examiner

FIG. 2A
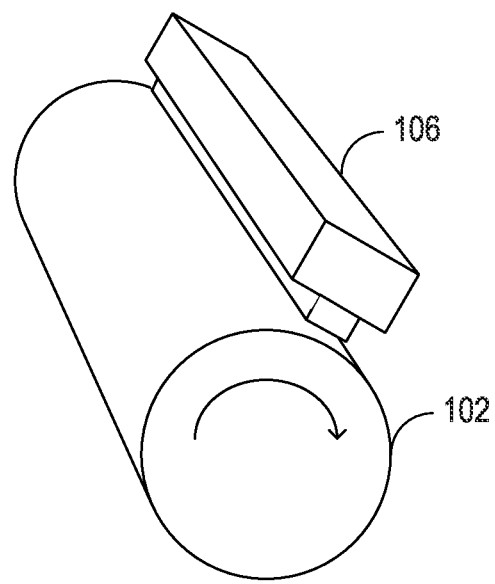
FIG. 2B
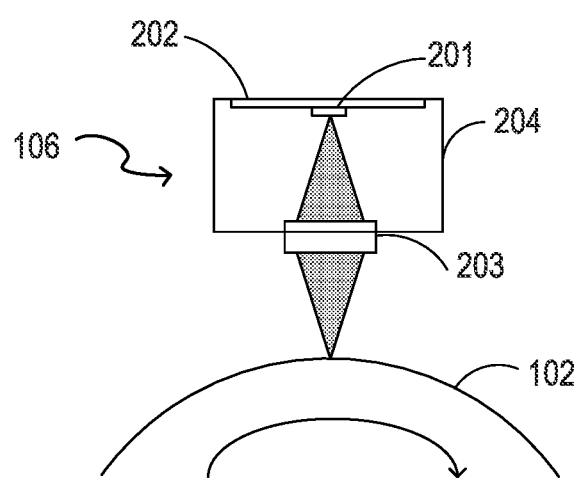
 LIGHT FLUX

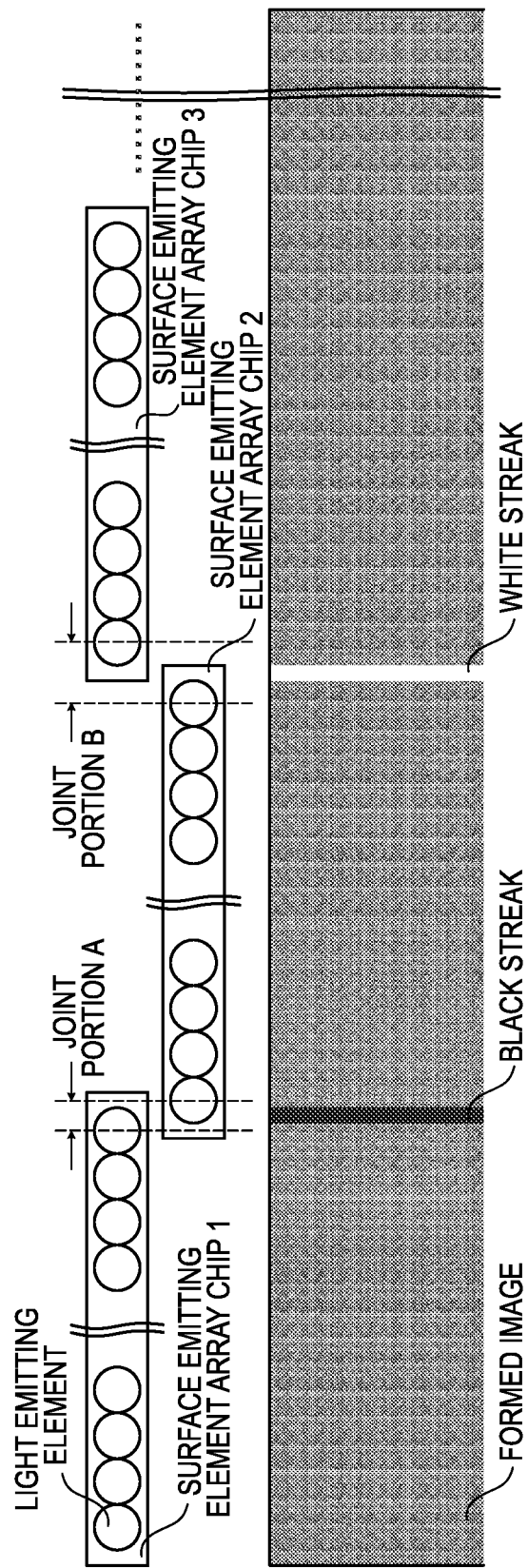

FIG. 20A

| | PWM DATA | | | | | | | |
|---|---|---|---|---|---|---|---|---|
| 000 | 0 | 0 | 0 | 0 | 0 | 0 | 0 | 0 |
| 001 | 0 | 0 | 0 | 0 | 0 | 0 | 1 | 1 |
| 010 | 0 | 0 | 0 | 0 | 1 | 1 | 1 | 1 |
| 011 | 0 | 0 | 1 | 1 | 1 | 1 | 1 | 1 |
| 100 | 1 | 1 | 1 | 1 | 1 | 1 | 1 | 1 |

FIG. 20B

| | PWM DATA | | | | | | | |
|---|---|---|---|---|---|---|---|---|
| 000 | 0 | 0 | 0 | 0 | 0 | 0 | 0 | 0 |
| 001 | 1 | 1 | 0 | 0 | 0 | 0 | 0 | 0 |
| 010 | 1 | 1 | 1 | 1 | 0 | 0 | 0 | 0 |
| 011 | 1 | 1 | 1 | 1 | 1 | 1 | 0 | 0 |
| 100 | 1 | 1 | 1 | 1 | 1 | 1 | 1 | 1 |

FIG. 20C

| | PWM DATA | | | | | | | |
|---|---|---|---|---|---|---|---|---|
| 000 | 0 | 0 | 0 | 0 | 0 | 0 | 0 | 0 |
| 001 | 0 | 0 | 0 | 1 | 1 | 0 | 0 | 0 |
| 010 | 0 | 0 | 1 | 1 | 1 | 1 | 0 | 0 |
| 011 | 0 | 1 | 1 | 1 | 1 | 1 | 1 | 0 |
| 100 | 1 | 1 | 1 | 1 | 1 | 1 | 1 | 1 | ically cause formation of a
IMAGE FORMING APPARATUS

CROSS-REFERENCE TO RELATED APPLICATIONS

This application is a Continuation of International Patent Application No. PCT/JP2019/025416, filed Jun. 26, 2019, which claims the benefit of Japanese Patent Application No. 2018-121820, filed Jun. 27, 2018, both of which are hereby incorporated by reference herein in their entirety.

BACKGROUND OF THE INVENTION

Field of the Invention

The present invention relates to an electrophotographic image forming apparatus.

Description of the Related Art

With regard to a printer being an electrophotographic image forming apparatus, there is generally known a method of exposing a photosensitive drum through use of an exposure head adopting, for example, a light emitting diode (LED) or an organic electroluminescence (EL) device, to thereby form a latent image on the photosensitive drum. The exposure head includes rows of light emitting elements arranged in a longitudinal direction of the photosensitive drum and a rod lens array configured to cause light beams from the rows of light emitting elements to form an image on the photosensitive drum. A known configuration of the LED or the organic EL device has a surface emitting shape, in which a direction of illuminating light from a light emitting surface is matched with a direction of the rod lens array. A length of each of the rows of the light emitting elements is determined by a width of an image region on the photosensitive drum, and intervals between the light emitting elements are determined by a resolution of the printer. For example, in the case of a 1,200 dpi printer, intervals between pixels are 21.16 μm and accordingly the intervals between the light emitting elements have values corresponding to 21.16 μm. A printer using such an exposure head uses fewer components than those used in a laser scanning printer, in which a photosensitive drum is scanned with a laser beam deflected by a rotary polygon mirror. Therefore, it is easier to reduce the size and cost of the apparatus. In addition, in the printer using the exposure head, sound resulting from the rotation of the rotary polygon mirror is reduced.

In such a configuration using the exposure head, an image tilt is liable to occur for each toner color due to variations in mounting position of the exposure head with respect to the photosensitive drum. In order to correct this tilt, there is a method of shifting a position of image data in a rotation direction (sub-scanning direction) of the photosensitive drum. Further, as a method for reducing an image defect at misregistration position of the image when the image data is shifted, there is known a method of increasing a resolution in the sub-scanning direction to shift the image data more finely. In Japanese Patent No. 5691330, there is described a proposal for achieving a process of performing image data shift in the sub-scanning direction at a resolution of N times larger than that in a main scanning direction with a simpler configuration.

Further, the exposure head using the LED generally has a configuration in which a plurality of surface emitting element array chips are arranged side by side to allow image formation corresponding to an image width of about 316 mm. However, depending on an accuracy of mounting the surface emitting element array chips, a misregistration of about several microns occurs at a joint portion. This misregistration may disadvantageously cause formation of a black streak image or a white streak image at the joint portion. There is known a technology of correcting a streak formed at the joint portion. For example, in Japanese Patent No. 4344585, there is described a configuration in which a light amount of the light emitting element corresponding to the joint position and a light amount of the surrounding light emitting element are controlled depending on an overlapping degree of the light emitting elements corresponding to the position of the joint portion.

However, although Japanese Patent No. 5691330 has a description about a filtering process (resolution converting process), there is no description about correction of the joint portion. Further, although Japanese Patent No. 4344585 has a description about correction of the joint portion, there is no description about the filtering process (resolution conversion). In the configuration in which the image data is subjected to image processing other than the correction of the joint portion, the timing at which the joint portion is corrected greatly affects an accuracy of the correction. For example, in a case in which an interval between pixels of the image data is converted to have a lower resolution by image processing in accordance with an interval between elements of the exposure head, when the joint correction is performed before the conversion to the lower resolution, the image data may be deteriorated through the resolution decreasing process, thereby causing reduction in positional accuracy of the joint correction. As a result, accurate correction cannot be performed at the joint portion, and hence a black streak image or a white streak image is formed.

SUMMARY OF THE INVENTION

The present invention has been made in view of the above-mentioned circumstances, and has an object to achieve high-quality image formation regardless of an accuracy of mounting surface emitting element array chips.

In order to achieve the above-mentioned object, the present invention has the following configuration.

An image forming apparatus includes: (1) a photosensitive member to be driven to rotate; (2) an exposure head including: a chip including a plurality of light emitting elements configured to expose the photosensitive member, the chip including a plurality of chips; and a circuit board on which the plurality of chips are arrayed at positions different from each other in an intersecting direction intersecting with a rotation direction of the photosensitive member, the plurality of chips including odd-numbered chips and even-numbered chips arrayed at positions different from each other in the rotation direction and further including chips arranged adjacent to each other in the intersecting direction so as to have an overlapping portion at end portions thereof, the image forming apparatus being configured to form an image at a first resolution corresponding to an array interval of the plurality of light emitting elements in the intersecting direction; a data generating unit configured to generate, based on input image data, pixel data items respectively corresponding to pixels equivalent to a second resolution higher than the first resolution, in association with positions of the pixels in the intersecting direction; a first correction unit configured to correct a misregistration amount from an interval equivalent to the first resolution at the overlapping portion between a predetermined chip and a chip arranged adjacent to the predetermined chip in the intersecting direction; and a conversion unit configured to convert a plurality of pixel data items equivalent to the second resolution into pixel data items of pixels equivalent to the first resolution corresponding to the positions of the plurality of pixel data items, the first correction unit being configured to correct the misregistration amount at the overlapping portion with respect to pixel data obtained after a resolution thereof is converted by the conversion unit.

Further features of the present invention will become apparent from the following description of exemplary embodiments with reference to the attached drawings.

BRIEF DESCRIPTION OF THE DRAWINGS

FIG. 2A is a view for illustrating a positional relationship between an exposure head and a photosensitive drum in the embodiment.

FIG. 2B is a view for illustrating a configuration of the exposure head.

FIG. 15 is a view for illustrating joint portions of the surface emitting element array chips in the embodiment.

FIG. 20A is a diagram for illustrating a look-up table in the embodiment.

FIG. 20B is a diagram for illustrating a look-up table in the embodiment.

FIG. 20C is a diagram for illustrating a look-up table in the embodiment.

DESCRIPTION OF THE EMBODIMENTS

Figure 1:
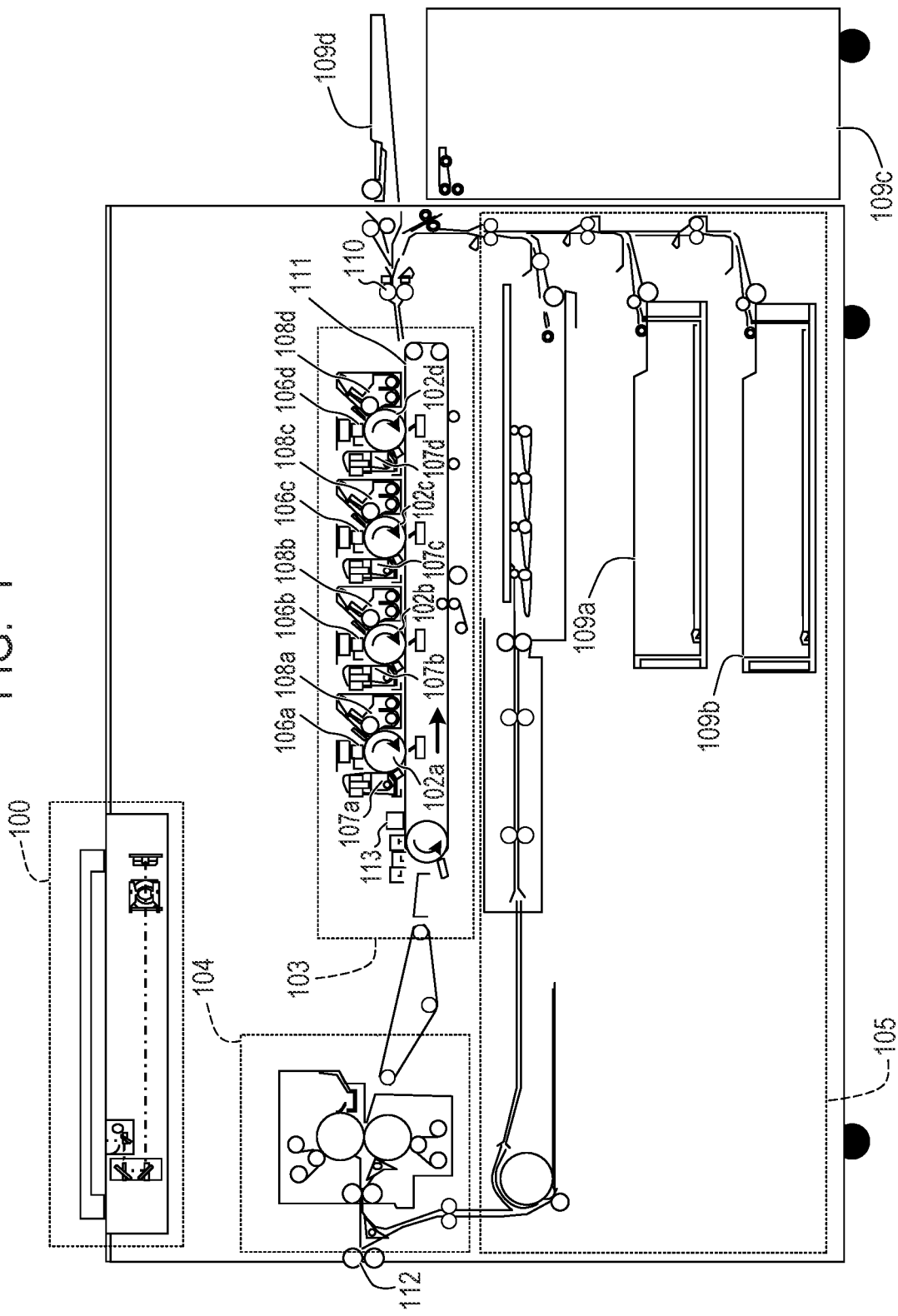
FIG. 1 is a schematic cross-sectional view for illustrating a configuration of an image forming apparatus according to an embodiment.

Referring to the drawings, an embodiment of the present invention is described below in detail.

[Configuration of Image Forming Apparatus]

FIG. 1 is a schematic cross-sectional view for illustrating a configuration of an electrophotographic image forming apparatus according to an embodiment. The image forming apparatus illustrated in FIG. 1 is a multi-functional printer (MFP) having a scanning function and a printing function, and includes a scanner portion 100, an image forming portion 103, a fixing portion 104, a paper feeding/conveying portion 105, and a printer controller (not shown) configured to control those portions. The scanner portion 100 illuminates an original placed on an original table with light to optically read an original image, and converts the read image to an electrical signal to produce image data.

The image forming portion 103 includes a series of four image forming stations arranged in the color order of cyan (C), magenta (M), yellow (Y), and black (K) along a direction (counterclockwise direction) of rotation of an endless conveying belt 111. Each of the four image forming stations has the same configuration, and includes a photosensitive drum 102 serving as a photosensitive member configured to rotate in a direction of the arrow (clockwise direction), an exposure head 106, a charging device 107, and a developing device 108. Suffixes "a", "b", "c", and "d" following the reference numerals 102, 106, 107, and 108 of the photosensitive drum 102, the exposure head 106, the charging device 107, and the developing device 108 represent respective configurations corresponding to the black (K), the yellow (Y), the magenta (M), and the cyan (C) associated with the image forming stations. In the following, the suffixes of the reference numerals are omitted except when a specific photosensitive drum or the like is to be specified by the suffix.

In the image forming portion 103, the photosensitive drum 102 is driven to rotate and charged by the charging device 107. The exposure head 106 serving as an exposure unit causes an LED array, in which LEDs are arranged, to emit light based on image data, and causes a rod lens array to focus emitted light from chip surfaces of the LED array onto the photosensitive drum 102 (onto the photosensitive member) to form an electrostatic latent image. The developing device 108 develops the electrostatic latent image formed on the photosensitive drum 102 with a toner. Then, the developed toner image is transferred onto recording paper on the conveying belt 111 configured to convey the recording paper. Such a sequential electrophotographic process is performed in each of the image forming stations. During image formation, after a lapse of a predetermined time period from the initiation of the image formation in the cyan (C) image forming station, respective image forming operations are performed in succession in the magenta (M), yellow (Y), and black (K) image forming stations.

The image forming apparatus illustrated in FIG. 1 includes, as units configured to feed the recording paper, main-body paper feeding units 109a and 109b included in the paper feeding/conveying portion 105, an external paper feeding unit 109c, which is a large-capacity paper feeding unit, and a manual paper feeding unit 109d. During the image formation, the recording paper is fed from one of the paper feeding units that is specified in advance, and the fed recording paper is conveyed to registration rollers 110. The registration rollers 110 convey the recording paper onto the conveying belt 111 at a time when the toner images formed in the image forming portion 103 described above are transferred onto the recording paper. Onto the recording paper conveyed by the conveying belt 111, the toner images formed on the photosensitive drums 102 of the individual image forming stations are sequentially transferred. The recording paper on which the unfixed toner images are transferred is conveyed to the fixing portion 104. The fixing portion 104 has an internal heat source, for example, a halogen heater, and applies heat and pressure to the toner images on the recording paper with two rollers to fix the toner images onto the recording paper. The recording paper having the toner images fixed thereon by the fixing portion 104 is discharged by discharge rollers 112 to the outside of the image forming apparatus.

On a downstream side of the black (K) image forming station in a direction of conveyance of the recording paper, an optical sensor 113 serving as a sensing unit is disposed at a position facing the conveying belt 111. The optical sensor 113 detects a position of a test image formed on the conveying belt 111 to determine a color misregistration amount between the toner images from the individual image forming stations. The color misregistration amount determined by the optical sensor 113 is reported to a control substrate 415 (see FIG. 4) (described later), and the positions of the images in the individual colors are corrected to allow a full-color toner image free from color shift to be transferred onto the recording paper. The printer controller (not shown) performs an image forming operation based on an instruction from an MFP controller (not shown) configured to control the entire multi-functional printer (MFP), while controlling the above-mentioned scanner portion 100, image forming portion 103, fixing portion 104, paper feeding/conveying portion 105, and other portions.

As an example of the electrophotographic image forming apparatus, the image forming apparatus of the type configured to transfer the toner images formed on the photosensitive drums 102 in the individual image forming stations directly onto the recording paper on the conveying belt 111 has been described above. However, the present invention is not limited to such a printer of the type configured to transfer the toner images on the photosensitive drums 102 directly onto the recording paper. The present invention is also applicable to an image forming apparatus including, for example, a primary transfer portion configured to transfer the toner images on the photosensitive drums 102 onto an intermediate transfer belt and a secondary transfer portion configured to transfer the toner images on the intermediate transfer belt onto the recording paper.

[Configuration of Exposure Head]

Next, each of the exposure heads 106 configured to perform exposure on the corresponding photosensitive drum 102 is described with reference to FIG. 2A and FIG. 2B. FIG. 2A is a perspective view for illustrating a positional relationship between the exposure head 106 and the photosensitive drum 102. FIG. 2B is a view for illustrating an inner configuration of the exposure head 106 and focusing of a light flux from the exposure head 106 by a rod lens array 203 onto the photosensitive drum 102. As illustrated in FIG. 2A, the exposure head 106 is mounted to the image forming apparatus through use of a mounting member (not shown) to be located at a position above and facing the photosensitive drum 102 rotating in a direction of the arrow (FIG. 1).

As illustrated in FIG. 2B, the exposure head 106 includes a drive circuit board 202, a surface emitting element array element group 201 mounted on the drive circuit board 202, the rod lens array 203, and a housing 204. To the housing 204, the rod lens array 203 and the drive circuit board 202 are mounted. The rod lens array 203 focuses the light flux from the surface emitting element array element group 201 onto the photosensitive drum 102. In a factory, the exposure head 106 is solely subjected to assembly and adjustment work and, for each of spots, focus adjustment and light amount adjustment are performed. In this case, the assembly and adjustment are performed such that each of a distance between the photosensitive drum 102 and the rod lens array 203 and a distance between the rod lens array 203 and the surface emitting element array element group 201 is a predetermined interval. As a result, light from the surface emitting element array element group 201 is focused on the photosensitive drum 102. Accordingly, during the focus adjustment in the factory, a position at which the rod lens array 203 is mounted is adjusted such that the distance between the rod lens array 203 and the surface emitting element array element group 201 has a predetermined value. Further, during the light amount adjustment in the factory, the light emitting elements of the surface emitting element array element group 201 are sequentially caused to emit light, and drive currents of the light emitting elements are adjusted such that the light focused on the photosensitive drum 102 via the rod lens array 203 has a predetermined light amount.

[Configuration of Surface Emitting Element Array Element Group]

Figure 3A:
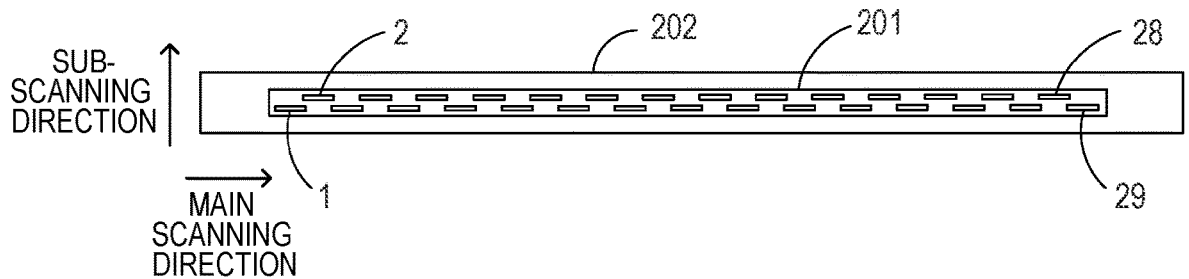
FIG. 3A is a schematic view for illustrating a drive circuit board in the embodiment.
Figure 3B:
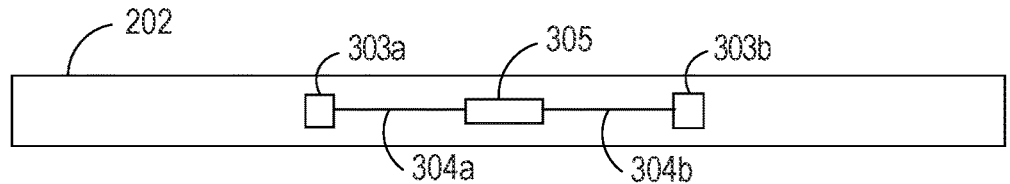
FIG. 3B is a view for illustrating a configuration of surface emitting element array chips.

FIG. 3A and FIG. 3B are views for illustrating the surface emitting element array element group 201. FIG. 3A is a schematic diagram for illustrating a configuration of a surface of the drive circuit board 202 on which the surface emitting element array element group 201 is mounted. FIG. 3B is a schematic diagram for illustrating a configuration of a surface (second surface) of the drive circuit board 202 opposite to the surface (first surface) thereof on which the surface emitting element array element group 201 is mounted.

As illustrated in FIG. 3A, the surface emitting element array element group 201 mounted on the drive circuit board 202 has a configuration in which 29 surface emitting element array chips 1 to 29 are arranged in two rows in a staggered configuration along a longitudinal direction of the drive circuit board 202. In FIG. 3A, the vertical direction indicates a sub-scanning direction (direction of rotation of the photosensitive drum 102) being a first direction, and the horizontal direction indicates a main scanning direction being a second direction perpendicular to the sub-scanning direction. The main scanning direction is also an intersecting direction intersecting with the direction of rotation of the photosensitive drum 102. In each of the surface emitting element array chips, individual elements of the surface emitting element array chip having the total of 516 luminous points are arranged with a predetermined resolution pitch in a longitudinal direction of the surface emitting element array chip. In the first embodiment, the pitch of the individual elements of the surface emitting element array chip is approximately 21.16 μm (≈22.54 cm/1,200 dots) corresponding to a pitch at a resolution of 1,200 dpi being a first resolution. As a result, an end-to-end distance between two of the 516 luminous points that are located at both ends in one surface emitting element array chip is about 10.9 mm (≈21.16 μm×516). The surface emitting element array element group 201 includes the 29 surface emitting element array chips. The number of the light emitting elements that can be exposed in the surface emitting element array element group 201 is 14,964 (=516 elements×29 chips), which allows for image formation corresponding to an image width of about 316 mm (≈about 10.9 mm×29 chips) in the main scanning direction.

Figure 3C:
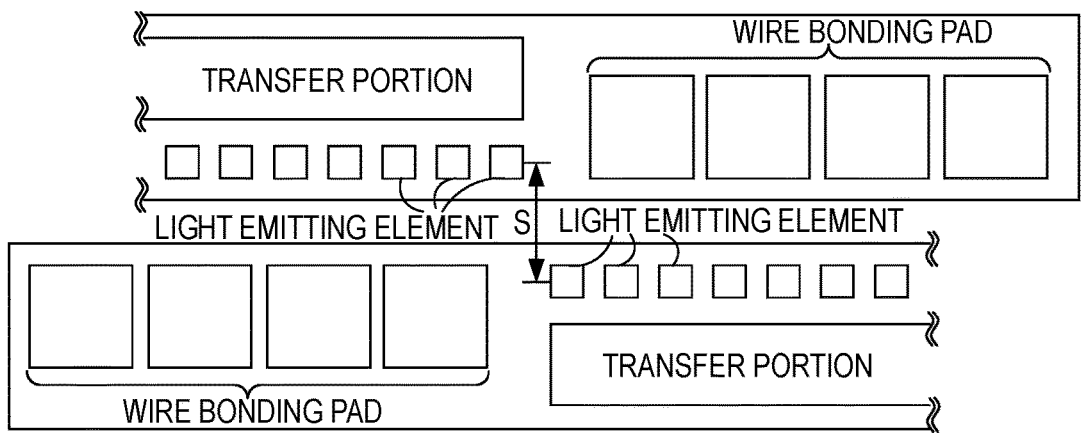
FIG. 3C is a view for illustrating a state at a boundary portion between the surface emitting element array chips.

FIG. 3C is a diagram for illustrating an inter-chip boundary portion between the surface emitting element array chips arranged in the two rows in the longitudinal direction. The horizontal direction in FIG. 3C corresponds to the longitudinal direction of the surface emitting element array element group 201 in FIG. 3A. As illustrated in FIG. 3C, on an end portion of each of the surface emitting element array chips, wire bonding pads, to which a control signal is to be input, are disposed. The signal input to the wire bonding pads drives a transfer portion and light emitting elements. Each of the surface emitting element array chips includes the plurality of light emitting elements. In the boundary portion between the surface emitting element array chips also, the pitch of the light emitting elements in the longitudinal direction (distance between the respective center points of the two light emitting elements) is approximately 21.16 μm corresponding to a pitch at the resolution of 1,200 dpi. The light emitting element array chips arranged in the upper and lower two rows are disposed such that a distance (represented by an arrow S in FIG. 3C) between the respective luminous points in the upper and lower surface emitting element array chips is about 84 μm (a distance corresponding to an integral multiple of a pitch at each resolution, which corresponds to four pixels at 1,200 dpi and to eight pixels at 2,400 dpi).

Further, as illustrated in FIG. 3B, on the surface of the drive circuit board 202 opposite to the surface thereof on which the surface emitting element array element group 201 is mounted, drive portions 303a and 303b and a connector 305 are mounted. The drive portions 303a and 303b are driver ICs. The drive portions 303a and 303b disposed on both sides of the connector 305 are configured to drive the surface emitting element array chips 1 to 15 and the surface emitting element array chips 16 to 29, respectively. The drive portions 303a and 303b are connected to the connector 305 via patterns 304a and 304b, respectively. The connector 305 is connected to signal lines for signals transmitted from the control circuit board 415 (see FIG. 4) (described later) to control the respective drive portions 303a and 303b, to a power supply, and to the ground, while being connected to the drive portions 303a and 303b. From the drive portions 303a and 303b, respective wires for driving the surface emitting element array element group 201 extend through an inner layer of the drive circuit board 202 to be connected to the surface emitting element array chips 1 to 15 and to the surface emitting element array chips 16 to 29.

[Control Configuration of Circuit Board and Exposure Head]

Figure 4:
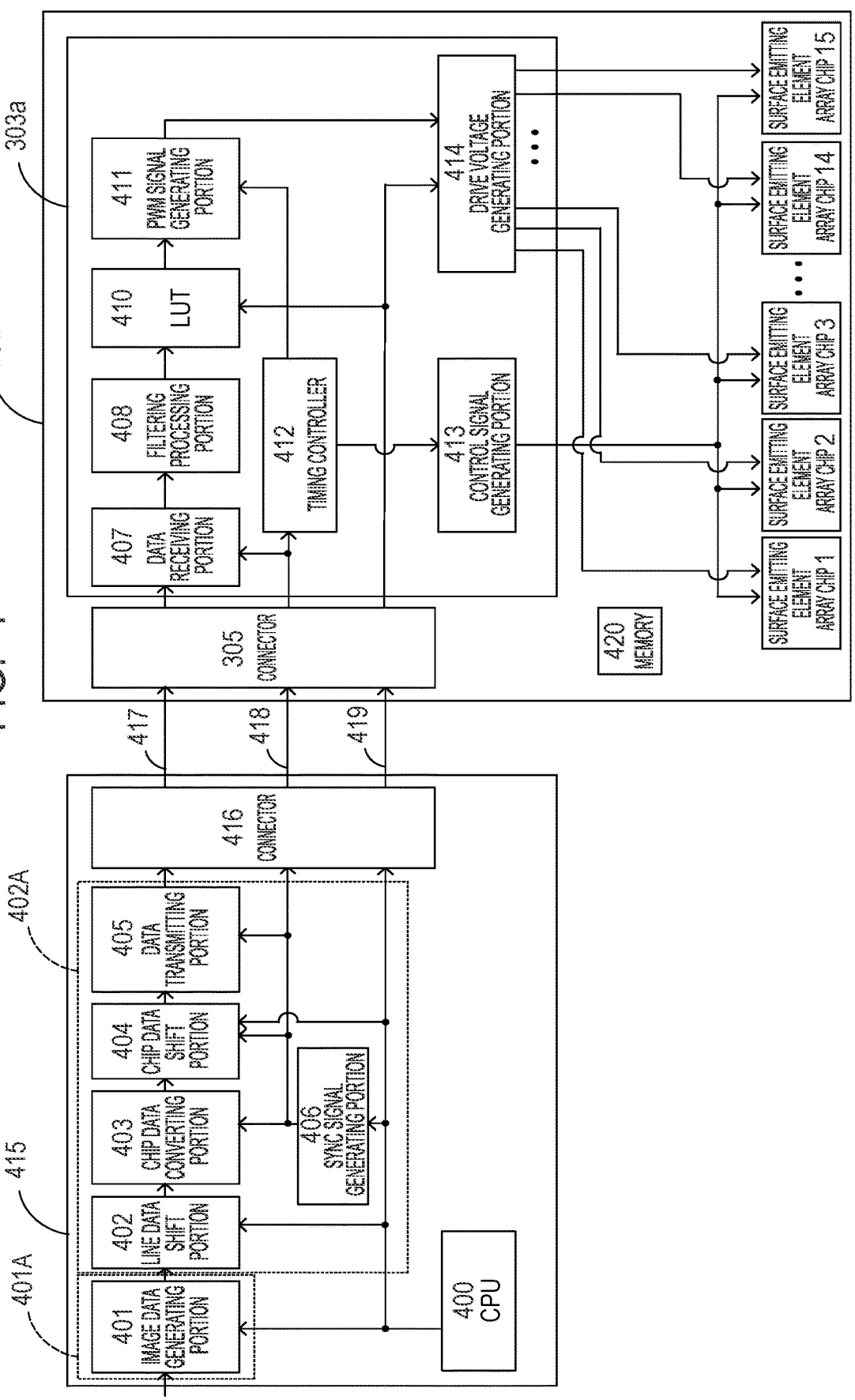
FIG. 4 is a control block diagram of a control circuit board and the exposure head in the embodiment.

FIG. 4 is a control block diagram of the control circuit board 415 configured to process the image data and output the image data to the exposure head 106, and the drive circuit board 202 configured to expose the photosensitive drum 102 based on the image data input from the control circuit board 415. Individual blocks 401 to 414 described below indicate modules in an IC. The drive circuit board 202 is described in association with the surface emitting element array chips 1 to 15 to be controlled by the drive portion 303a illustrated in FIG. 4. The surface emitting element array chips 16 to 29 to be controlled by the drive portion 303b (not shown in FIG. 4) also perform the same operations as those performed by the surface emitting element array chips 1 to 15 to be controlled by the drive portion 303a. Further, for simpler description, image processing for one color is described herein, but, in the image forming apparatus of this embodiment, the same processing is simultaneously performed for each of the four colors as parallel processing. The control circuit board 415 illustrated in FIG. 4 has a connector 416 for transmitting a signal for controlling the exposure head 106. From the connector 416, image data, a line sync signal (described later), and a control signal from a CPU 400 of the control circuit board 415 are transmitted via cables 417, 418, and 419, respectively, which are connected to the connector 305 of the exposure head 106.

[Control Circuit Board]

In the control circuit board 415, the CPU 400 performs processing of the image data. The control circuit board 415 includes functional blocks including an image data generating portion 401, a line data shift portion 402, a chip data converting portion 403, a chip data shift portion 404, a data transmitting portion 405, and a sync signal generating portion 406. In the following, processing in each of the functional blocks in the order is described in which the image data is processed in the control circuit board 415.

(Image Data Generating Portion)

The image data generating portion 401 serving as a data generating unit performs, on input image data received from the scanner portion 100 or from an external computer connected to the image forming apparatus, a dithering process at a resolution specified by the CPU 400 to generate the image data for print-out. In this embodiment, it is assumed that the image data generating portion 401 performs the dithering process at a resolution of 2,400 dpi equivalent to a second resolution. In other words, the image data generated by the image data generating portion 401 is pixel data equivalent to 2,400 dpi. The pixel data equivalent to 2,400 dpi in this embodiment is assumed to be one-bit data, but it is also possible to represent one pixel in a plurality of bits. The pixel data generated by the image data generating portion 401 is line data corresponding to a line equivalent to 2,400 dpi in the sub-scanning direction. The image data generating portion 401 generates, based on the input image data, the pixel data corresponding to each of pixels equivalent to 2,400 dpi in association with a position of the pixel in the intersecting direction.

(Line Data Shift Portion)

The CPU 400 determines respective amounts of image shift in the main scanning direction (longitudinal direction of the exposure head 106) and the sub-scanning direction (rotation direction of the photosensitive drum 102 and also direction of conveyance of the recording paper) in units of 2,400 dpi based on the color misregistration amounts sensed by the optical sensor 113. The amounts of image shift are determined by the CPU 400 based on, for example, relative amounts of color misregistration from one color to another, which are calculated based on the result of the sensing of a color misregistration detection pattern image by the optical sensor 113. Then, the CPU 400 specifies an amount of image shift to the line data shift portion 402 serving as a second correction unit. The line data shift portion 402 performs, on the entire image region in one page of the recording paper, a shifting process on the image data input from the image data generating portion 401 in units of 2,400 dpi based on the amount of image shift specified by the CPU 400. The line data shift portion 402 may also divide the image region in one page of the recording paper into a plurality of image regions and perform the shifting process on each of the plurality of image regions resulting from the division.

(Sync Signal Generating Portion)

The sync signal generating portion 406 generates a cycle time signal (hereinafter referred to as "line sync signal"), which is synchronous with a rotating speed of the photosensitive drum 102 and corresponds to one line in the direction of rotation of the photosensitive drum 102. The CPU 400 specifies, to the sync signal generating portion 406, the cycle time of the line sync signal, that is, a time period required by the surface of the photosensitive drum 102 to move by a pixel size (about 10.5 μm) at 2,400 dpi in the direction of rotation of the photosensitive drum 102 (in the sub-scanning direction) at the rotating speed of the photosensitive drum 102 determined in advance. For example, when printing is performed at a speed of 200 mm/second in the sub-scanning direction, the CPU 400 determines that the cycle time (cycle time corresponding to one line in the sub-scanning direction) of the line sync signal is about 52.9 μs (≈(25.4 mm/2,400 dots)/200 mm) and specifies the cycle time to the sync signal generating portion 406. When the image forming apparatus has a sensing portion (for example, an encoder placed on a rotary shaft of the photosensitive drum) configured to sense the rotating speed of the photosensitive drum, the CPU 400 calculates the rotating speed of the photosensitive drum 102 in the sub-scanning direction based on a result of sensing (a generation cycle time of a signal output from the encoder) by the sensing portion. Then, the CPU 400 determines the cycle time of the line sync signal based on the result of the calculation. Meanwhile, when the image forming apparatus does not have a sensing portion configured to sense the rotating speed of the photosensitive drum, the CPU 400 determines the cycle time of the line sync signal based on information on the type of paper such as a sheet basis weight (g/cm$^2$) or a sheet size input by a user via an operating portion.

(Chip Data Converting Portion)

The chip data converting portion 403 reads out, in synchronization with the line sync signal, line data for each one line of an output image at the resolution in the sub-scanning direction (rotation direction) of the photosensitive drum 102 from the line data shift portion 402 on a line-by-line basis. Then, the chip data converting portion 403 performs data processing in which the read line data is divided into line data items corresponding to the individual chips.

Figure 5A:
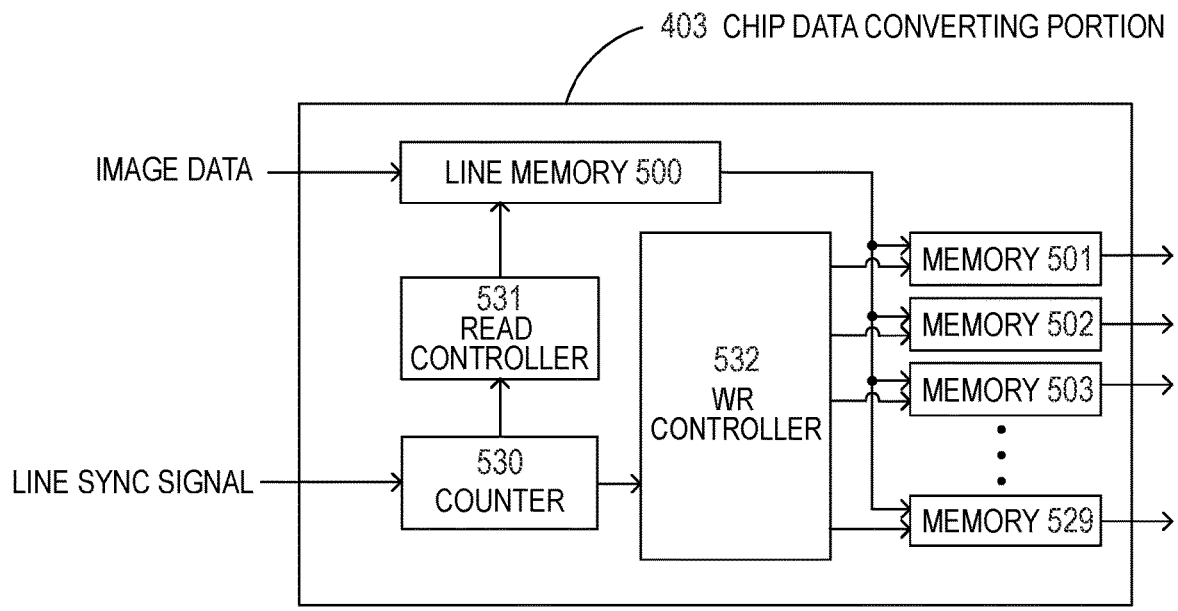
FIG. 5A is a control block diagram of a chip data converting portion in the embodiment.

FIG. 5A is a block diagram for illustrating a configuration of the chip data converting portion 403. In FIG. 5A, the line sync signal output from the sync signal generating portion 406 is input to a counter 530. The counter 530 includes a frequency modulation circuit configured to modulate the input line sync signal to generate a CLK signal at a frequency higher than that of the line sync signal. The counter 530 may also include, instead of the frequency modulation circuit, an embedded oscillating device configured to generate a clock signal (CLK) at a frequency higher than that of the line sync signal. In the following, by way of example, description is given of a configuration in which the chip data converting portion 403 reads out the line data from the line data shift portion 402, but the embodiment is not limited thereto. Specifically, it is also possible to use a configuration in which the line sync signal is supplied to the line data shift portion 402, and the line data shift portion 402 generates a CLK signal therein and voluntarily transmits the line data to the chip data converting portion 403.

Figure 5B:
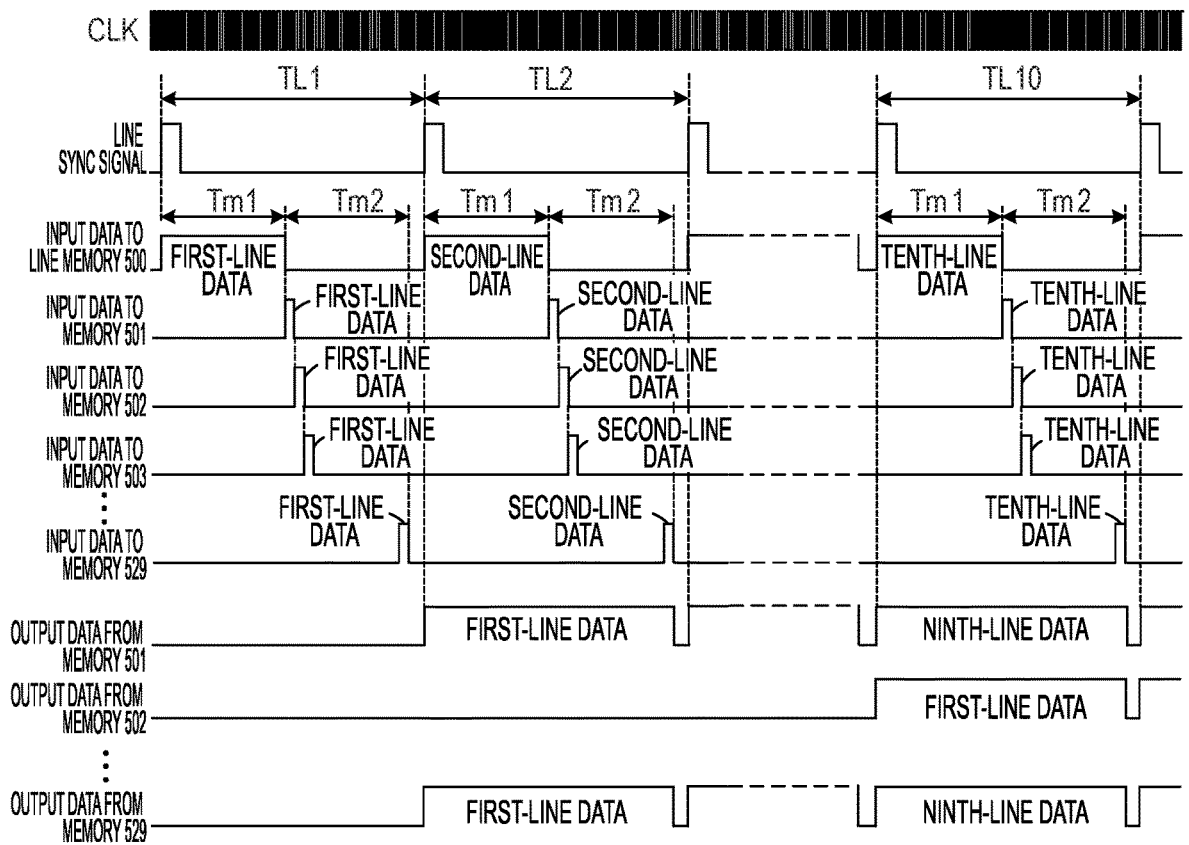
FIG. 5B is a timing chart at the time of chip data conversion.

When the line sync signal is input to the counter 530, the counter 530 resets a count value to 0 and then increments the count value in synchronization with the pulse number of the clock (CLK) signal (see FIG. 5B). The frequency of the CLK signal generated from the counter 530 is determined at a design stage based on a size (number of bits) of the pixel data to be read out by the chip data converting portion 403 in one cycle time of the line sync signal and on a data processing speed of the chip data converting portion 403 (described later). For example, as described above, the surface emitting element array element group 201 includes 14,964 light emitting elements (calculated at 1,200 dpi) configured to expose one line in the sub-scanning direction. Meanwhile, the image data generating portion 401 performs the dithering process at a resolution of 2,400 dpi. Accordingly, the number of pixels of the image data corresponding to one line in the sub-scanning direction output from the line data shift portion 402 is 29,928 (=14,964×(2,400 dpi/1,200 dpi)). The chip data converting portion 403 performs, between the line sync signals, the reading out of the line data corresponding to one line in the sub-scanning direction and the writing of the image data into a line memory 500 (described later), while performing the writing of the image data into memories 501 to 529 (described later). Accordingly, the counter 530 performs an operation of counting a number (29,928) corresponding to double the number (59,856) of pixels included in the line data corresponding to one line. It is assumed that a period during which the count value of the counter 530 is from 1 to 29,928 is represented by "Tm1", and a period during which the count value is from 29,929 to 59,856 is represented by "Tm2" (see FIG. 5B). A read controller 531 reads the line data from the line data shift portion 402 based on the count value of the counter 530. Specifically, during the period Tm1, during which the count value of the counter 530 is from 1 to 29,928, the read controller 531 stores, in the line memory 500, the line data (29,928 pixels) corresponding to one line in the main scanning direction. During the period Tm2, during which the count value of the counter 530 is from 29,929 to 59,856, a WR controller 532 divides the line data corresponding to one line in the sub-scanning direction, which is stored in the line memory 500, and writes the divided line data into the memories 501 to 529. Each of the memories 501 to 529 has a storage capacity smaller than that of the line memory 500 and stores the line data divided for the individual chips (divided line data) on a per-chip basis. The memories 501 to 529 are first-in, first-out (FIFO) memories provided to correspond to the surface emitting element array chips 1 to 29. Specifically, the memory 501 stores the line data corresponding to the surface emitting element array chip 1, the memory 502 stores the line data corresponding to the surface emitting element array chip 2, . . . , and the memory 529 stores the line data corresponding to the surface emitting element array chip 29.

Subsequently, the writing of the line data read out from the line data shift portion 402 into the memories 501 to 529 and the outputting of the image data written into the memories 501 to 529 which are performed by the chip data converting portion 403 are described. FIG. 5B is a timing chart for illustrating input and output timings of the line data in the chip data converting portion 403. In FIG. 5B, "LINE SYNC SIGNAL" indicates a pulse signal output from the sync signal generating portion 406. Further, in FIG. 5B, TL1, TL2, . . . , and TL10 indicate numbers assigned to cycle times each corresponding to one line in the sub-scanning direction. Further, one cycle time of the line sync signal is divided into the period Tm1 and the period Tm2 based on the counter value of the counter 530. "INPUT DATA TO LINE MEMORY 500" indicates image data input from the line data shift portion 402, and the image data is input from the line data shift portion 402 during the period Tm1 of each of the cycle times TL1, TL2, . . . , and TL10. "FIRST-LINE DATA" of FIG. 5B indicates the line data of the first line in the sub-scanning direction (corresponding to one line in the main scanning direction). Likewise, "SECOND-LINE DATA," . . . , and "TENTH-LINE DATA" indicate the line data of the second line in the sub-scanning direction, . . . , and the line data of the tenth line in the sub-scanning direction (each corresponding to one line in the main scanning direction), respectively.

Further, "INPUT DATA TO MEMORY 501" of FIG. 5B indicates the timing at which, in the line data which is stored in the line memory 500 and corresponds to one line in the main scanning direction, the line data corresponding to the surface emitting element array chip 1 is written into the memory 501. Likewise, "INPUT DATA TO MEMORY 502," "INPUT DATA TO MEMORY 503," . . . , and "INPUT DATA TO MEMORY 529" indicate the timing at which line data items corresponding to the individual surface emitting element array chips 2, 3, . . . , and 29 are written into the memories 502, 503, . . . , and 529, respectively. "FIRST-LINE DATA" of "INPUT DATA TO MEMORY 501" does not indicate the entire line data corresponding to one line in the main scanning direction, but indicates the line data (divided line data) in the main scanning direction to which the surface emitting element array chip 1 corresponds. The same applies also to the input data items to the memories 502 to 529.

"OUTPUT DATA FROM MEMORY 501" of FIG. 5B indicates the timing at which the line data written into the memory 501 is read out to be output to the surface emitting element array chip 1. Likewise, "OUTPUT DATA FROM MEMORY 502," . . . , and "OUTPUT DATA FROM MEMORY 529" of FIG. 5B indicate the timing at which the line data items written into the memories 502, . . . , and 529 are read out to be output to the surface emitting element array chips 2, . . . , and 29, respectively. "FIRST-LINE DATA" of "OUTPUT DATA FROM MEMORY 501" does not indicate the entire line data corresponding to one line in the main scanning direction, but indicates the line data (divided line data) in the main scanning direction to which the surface emitting element array chip 1 corresponds. The same applies also to the output data items from the memories 502 to 529.

In this embodiment, from the line memory 500, the line data items each corresponding to one line in the main scanning direction are sequentially read out, and the line data item is first written into the memory 501 for storing the line data item corresponding to the surface emitting element array chip 1. Then, the line data item is written into the memory 502 for storing the image data item corresponding to the surface emitting element array chip 2, and subsequently, the line data items are continuously written sequentially into the memories 503 to 529 for storing the image data items corresponding to the surface emitting element array chips 3 to 29. In the chip data shift portion 404 in a stage subsequent to that of the chip data converting portion 403, a data shifting process in the sub-scanning direction is performed individually for each of the surface emitting element array chips. Accordingly, it is assumed that, in the memories 501 to 529, the line data items corresponding to ten lines in the sub-scanning direction are stored.

Further, the line data item is stored in each of the memories 501 to 529 together with, in addition to the line data item for one chip corresponding to each of the surface emitting element array chips, pixel data items obtained by copying pixel data items at end portions of adjacent surface emitting element array chips. For example, the following pixel data item is stored in the memory 502. That is, the pixel data item at the outermost end portion of the surface emitting element array chip 1 on the surface emitting element array chip 2 side and the pixel data item at the outermost end portion of the surface emitting element array chip 3 on the surface emitting element array chip 2 side are respectively added to both ends of the line data item corresponding to the surface emitting element array chip 2, and the obtained data is stored in the memory 502.

Figure 6:
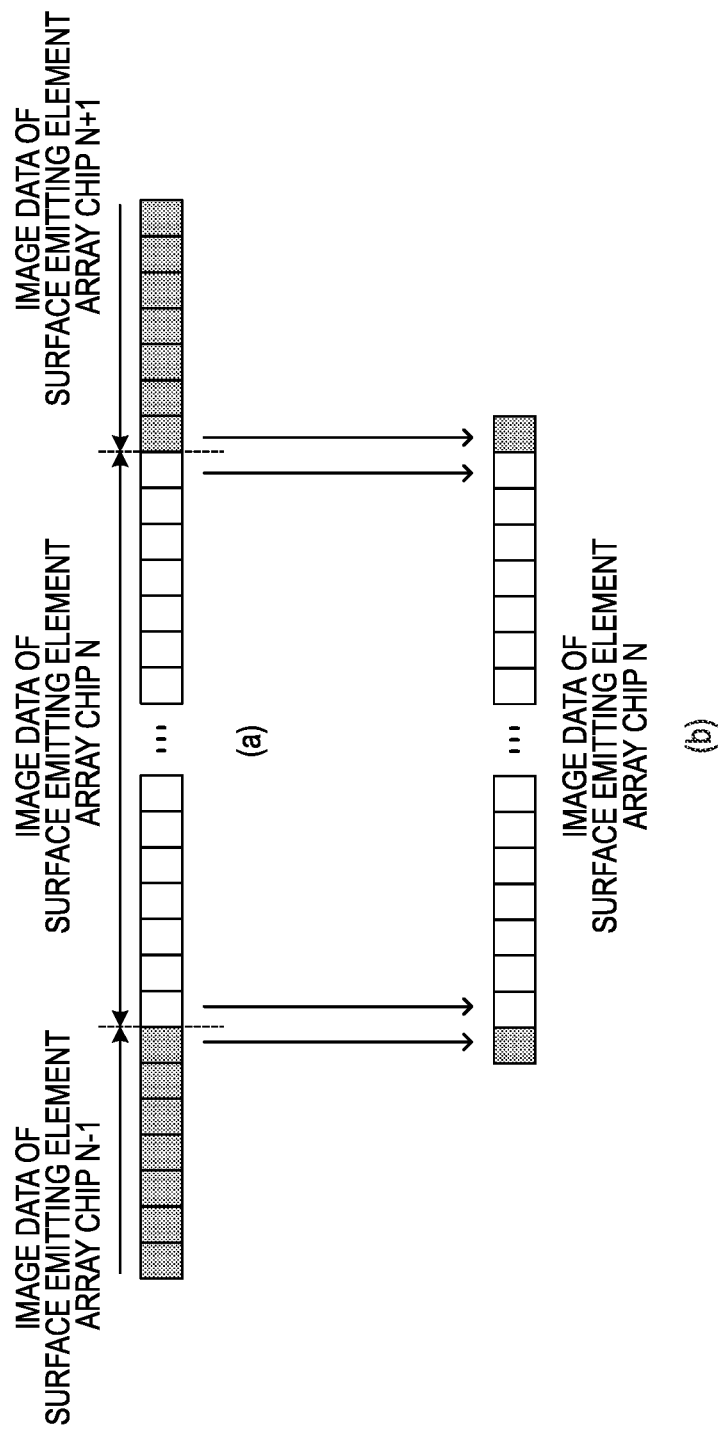
FIG. 6 is a diagram for illustrating a process performed on image data by the chip data converting portion in the embodiment.

FIG. 6 is a diagram for illustrating a relationship between the line data stored in the line memory 500 and the image data stored in each of the memories 501 to 529. Part (a) of FIG. 6 is a diagram for illustrating the line data for each of the surface emitting element array chips which is stored in the line memory 500, and shows an image of a line data array before the array is changed in the memories 501 to 529. The line memory 500 stores line data of a surface emitting element array chip (N−1) (indicated with hatching), line data of a surface emitting element array chip N (indicated as white boxes), and line data of a surface emitting element array chip (N+1) (indicated with hatching).

Meanwhile, part (b) of FIG. 6 shows an image of line data of a memory corresponding to the surface emitting element array chip N. As described above, the memories 502 to 528 corresponding to the surface emitting element array chips each store the line data of the corresponding surface emitting element array chip with pixel data items of end portions of adjacent surface emitting element array chips being added thereto. In the line data of the surface emitting element array chip N illustrated in part (b) of FIG. 6, the leftmost pixel data is pixel data which is included in the line data of the surface emitting element array chip (N−1) and is at the end portion adjacent to the surface emitting element array chip N (see the arrow of FIG. 6). Meanwhile, in the image data of the surface emitting element array chip N illustrated in part (b) of FIG. 6, the rightmost pixel data is pixel data which is included in the line data of the surface emitting element array chip (N+1) and is at the end portion adjacent to the surface emitting element array chip N (see the arrow of FIG. 6).

The memory 501 stores the line data corresponding to the surface emitting element array chip 1 with the pixel data of the outermost end portion of the surface emitting element array chip 2 on the surface emitting element array chip 1 side being added to the end portion thereof. Further, the memory 529 stores the line data corresponding to the surface emitting element array chip 29 with the pixel data of the outermost end portion of the surface emitting element array chip 28 on the surface emitting element array chip 29 side being added to the end portion thereof.

As described above, in this embodiment, the pixel data items at the end portions of adjacent surface emitting element array chips are added to both ends of the line data of the corresponding surface emitting element array chip for each of the surface emitting element array chips, and the obtained data is stored in each of the memories 501 to 529. With the above-mentioned operation of the chip data converting portion 403, the line data corresponding to one line in the main scanning direction is stored in each of the memories 501 to 529 provided to correspond to the surface emitting element array chips 1 to 29, respectively, together with the pixel data items of the end portions of the adjacent surface emitting element array chips. The pixel data items of the end portions of the adjacent surface emitting element array chips are used in a filtering processing portion 408 (described later).

(Chip Data Shift Portion)

The chip data shift portion 404 serving as a second correction unit performs the following control. Specifically, based on data (in units of 2,400 dpi) related to an amount of image shift in the sub-scanning direction for each of the surface emitting element array chips, which is specified in advance by the CPU 400, relative timing to read out the line data item from each of the memories 501 to 529 is controlled. In the following, an image shifting process in the sub-scanning direction, which is performed by the chip data shift portion 404, is specifically described.

It is desired that, in the longitudinal direction of the exposure head, there be no shift of the position at which each of the even-numbered surface emitting element array chips is mounted. Likewise, it is also desired that, in the longitudinal direction of the exposure head, there be no shift of the position at which each of the odd-numbered surface emitting element array chips is mounted. It is also preferred in terms of design that, in the sub-scanning direction, the position at which each of the even-numbered surface emitting element array chips is mounted and the position at which each of the odd-numbered surface emitting element array chips is mounted be shifted from each other by a predetermined number of pixels (for example, eight pixels) at 2,400 dpi. It is also preferred that a position at which a row of the light emitting elements is disposed in the sub-scanning direction be not allowed to vary from one surface emitting element array chip to another and be fixed in each of the surface emitting element array chips. However, the positions at which the surface emitting element array chips are mounted and the position at which the row of the light emitting elements is disposed include errors, and such errors may possibly degrade the image quality of an output image.

A memory 420 (ROM) illustrated in FIG. 4 stores therein correction data calculated from a relative positional relationship between the individual rows of the light emitting elements in the sub-scanning direction in the surface emitting element array chips 1 to 29, which are mounted in the staggered configuration on the drive circuit board 202. For example, the memory 420 stores therein the correction data based on measurement data, which indicates the number of pixels at 2,400 dpi by which each of the rows of the light emitting elements mounted on the drive circuit board 202 in the surface emitting element array chips 2 to 29 other than the surface emitting element array chip 1 is shifted in the sub-scanning direction from the row of the light emitting elements in the surface emitting element array chip 1 serving as a basis for a position in the sub-scanning direction. The measurement data is obtained as follows. After the surface emitting element array chips 2 to 29 are mounted on the drive circuit board 202, a measurement device turns ON the light emitting elements in each of the surface emitting element array chips and performs measurement based on the result of receiving light. The CPU 400 sets, in an internal register of the chip data shift portion 404, the correction data read out from the memory 420 in response to the turning ON of a power supply of the image forming apparatus. The chip data shift portion 404 performs a shifting process on the line data items each for forming the same line stored in the memories 501 to 529 based on the correction data set in the internal register. For example, when the row of the light emitting elements in the surface emitting element array chip 2 is mounted on the drive circuit board 202 while being shifted by eight pixels at 2,400 dpi from the row of the light emitting elements in the surface emitting element array chip 1 in the sub-scanning direction, the chip data shift portion 404 shifts all the line data items corresponding to the surface emitting element array chip 2 from the line data items corresponding to the surface emitting element array chip 1 so as to delay, from a time when each of the line data items corresponding to the surface emitting element array chip 1 is output to the drive circuit board 202, a time when each of the line data items corresponding to the surface emitting element array chip 2, which is for forming the same line, is output to the drive circuit board 202 by eight pixels.

(Data Transmitting Portion)

The data transmitting portion 405 transmits, to the drive circuit board 202 of the exposure head 106, the line data obtained after the above-mentioned series of data processing steps are performed on the line data. Referring back to FIG. 5B referred to above, the timing to transmit the image data is described. As illustrated in FIG. 3A, of the surface emitting element array chips, the odd-numbered surface emitting element array chips 1, 3, 5, . . . , 29 are disposed on an upstream side in the sub-scanning direction, and the even-numbered surface emitting element array chips 2, 4, 6, . . . , 28 are disposed on a downstream side in the sub-scanning direction. In the timing chart of FIG. 5B, writing of the image data items into the memories 501 and 529 corresponding to the odd-numbered surface emitting element array chips 1 and 29 is performed during the period of the first line sync signal (TL1 in FIG. 5B). Then, during the subsequent period of the line sync signal (TL2 in FIG. 5B), data items corresponding to the first line in the sub-scanning direction are read out from the memories 501 and 529 corresponding to the odd-numbered surface emitting element array chips 1 and 29. Likewise, during the period of the subsequent line sync signal (TL10 in FIG. 5B), data items corresponding to the second line in the sub-scanning direction are read out from the memories 501 and 529 corresponding to the odd-numbered surface emitting element array chips 1 and 29. Then, during the period of the tenth line sync signal, from the memories 501 and 529 corresponding to the odd-numbered surface emitting element array chips 1 and 29, data items corresponding to the ninth line in the sub-scanning direction are read out. From the memory 502 corresponding to the even-numbered surface emitting element array chip 2, the image data item is read out from the memory 502 during the period (TL10 in FIG. 5B) subsequent to the period TL1, during which the image data item is written into the memory 502, by nine pulses of the line sync signal.

The data transmitting portion 405 transmits the line data items processed by the chip data shift portion 404 to the drive circuit board 202. The counter 530 includes, instead of an oscillating device, a frequency modulation circuit configured to modulate the line sync signal input thereto to generate a CLK signal at a frequency higher than that of the line sync signal. The counter 530 may also include, instead of the frequency modulation circuit, an embedded oscillating device configured to generate a clock (CLK) signal at a frequency higher than that of the line sync signal. In this embodiment, the frequency of the clock signal (CLK in FIG. 5B) is determined such that the count value is equal to or larger than 59,856 (number that is double the number of pixel data items corresponding to one line) in one cycle time of the line sync signal. This allows the inputting (writing) of the image data to the line memory 500 and the outputting (writing) of the image data from the line memory 500 to the memories 501 to 529 to be performed in one cycle time of the line sync signal.

Meanwhile, data is read out from the memories 501 to 529 such that, from the 29 memories 501 to 529, the image data items each corresponding to one line in the main scanning direction and corresponding to the individual surface emitting element array chips are output in parallel in one cycle time of the line sync signal. Accordingly, the image data items may also be read out from the memories 501 to 529 at a speed lower than a speed at which the image data items are written into the memories. For example, in this embodiment, it is assumed that the image data items are read out from the memories 501 to 529 in a cycle time that is 58 times longer than the number of pulses at the time when the image data items are written into the memories 501 to 529.

The line data shift portion 402, the chip data converting portion 403, the chip data shift portion 404, the data transmitting portion 405, and the sync signal generating portion 406 form an integrated circuit 402A different from the integrated circuit 401A. Further, the CPU 400 is an integrated circuit different from the integrated circuit 401A and the integrated circuit 402A.

[Drive Portion of Exposure Head]

(Data Receiving Portion)

Next, a process to be performed in the drive portion 303a of the exposure head 106 is described. The drive portion 303a includes functional blocks of a data receiving portion 407, the filtering processing portion 408, an LUT 410, a PWM signal generating portion 411, a timing controller 412, a control signal generating portion 413, and a drive voltage generating portion 414. In the following, processes to be performed in the individual functional blocks are described in the order in which the image data is processed in the drive portion 303a. As described above, the chip data converting portion 403 obtains an image data array for each of the 29 surface emitting element array chips. The following processing blocks are configured to process in parallel the image data items stored in the 29 chips. It is assumed that the drive portion 303a includes a circuit capable of receiving the image data items corresponding to the surface emitting element array chips 1 to 15 to allow parallel processing for the surface emitting element array chips.

(Data Receiving Portion)

The data receiving portion 407 receives a signal transmitted from the data transmitting portion 405 of the control circuit board 415. It is assumed that the data receiving portion 407 and the data transmitting portion 405 receive and transmit the image data in units of line in the sub-scanning direction in synchronization with the line sync signal.

(Filtering Processing Portion)

Figure 7:
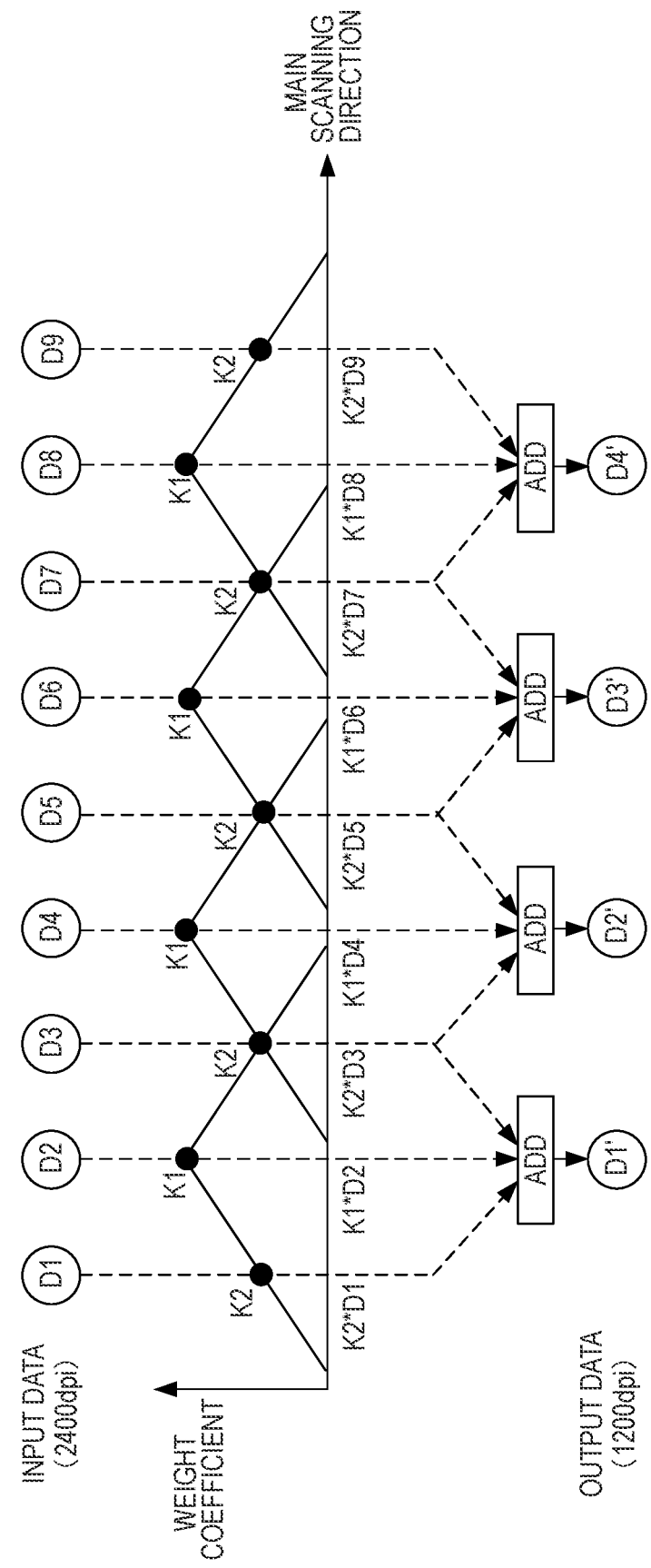
FIG. 7 is a diagram for illustrating a filtering process in the embodiment.

The filtering processing portion 408 subjects the image data of each of the surface emitting element array chips to an interpolating process by the filtering process in the main scanning direction, to thereby convert the resolution in the main scanning direction from 2,400 dpi to 1,200 dpi. FIG. 7 is a diagram for illustrating a manner of the filtering process performed by the filtering processing portion 408. In FIG. 7, D1 to D9 indicate image data items (input data items at 2,400 dpi) of the surface emitting element array chip. In this case, D1 indicates the above-mentioned pixel data of the end portion of the adjacent surface emitting element array chip, and the image data items of D2 and thereafter are image data items of the corresponding surface emitting element array chip. D1' to D4' indicate image data items (output data items at 1,200 dpi) obtained after the filtering process is performed by the filtering processing portion 408. The resolution (1,200 dpi) of the output data is ½ of the resolution (2,400 dpi) of the input data. An expression for calculating the image data of each pixel is as Expression 1 given below.

$$Dn' = D(2 \times n - 1) \times K2 + D(2 \times n) \times K1 + D(2 \times n + 1) \times K2 \quad \text{(Expression 1)}$$

In Expression 1, "n" corresponds to 516 which is the number of light emitting elements in each of the surface emitting element array chips and, based on the order in which the light emitting elements are turned on, an arithmetic operation of the image data for each of the light emitting elements is sequentially performed in the order of n=1 to 516. K1 serving as a first coefficient represents a weight coefficient for input data at the same coordinate position in the main scanning direction as that of output data, and K2 serving as a second coefficient represents a weight coefficient for input data at a coordinate shifted by half a pixel in the main scanning direction with respect to the output data. In this embodiment, an interpolation arithmetic operation (filtering process) is performed assuming that K1 and K2 have respective values of 0.5 and 0.25, but it is also possible to use weight coefficients different from those values used in this embodiment. In this embodiment, the weight coefficient K2 is set to a value larger than zero so that the information on the image data generated at a resolution (2,400 dpi) higher than the resolution (1,200 dpi) of the output data can be reflected on the output data. Specifically, a process from the image data generating portion 401 of the control circuit board 415 to the data receiving portion 407 of the exposure head 106 is performed with the image position being moved in the main scanning direction at 2,400 dpi, and in the subsequent-stage filtering processing portion 408, the resolution of the image data is converted into 1,200 dpi. In this manner, an image of 1,200 dpi can be generated under a state in which the image movement accuracy in units of 2,400 dpi is maintained.

Figure 8A:
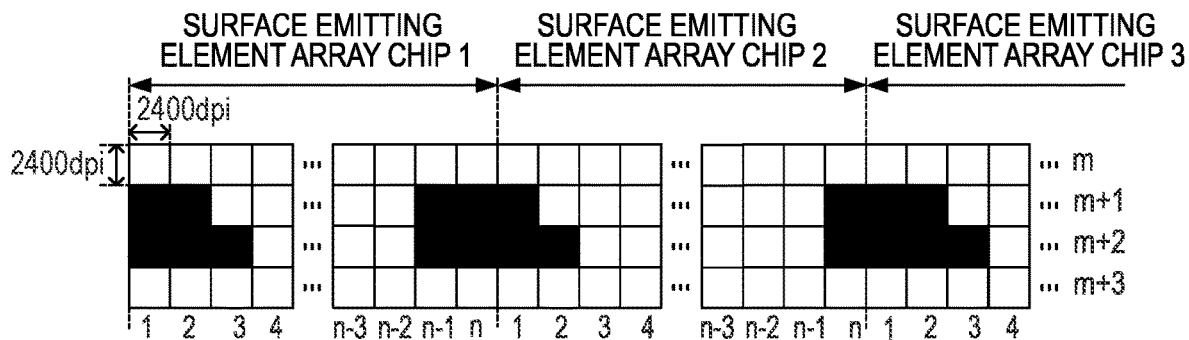
FIG. 8A is a diagram for illustrating the filtering process in the embodiment.
Figure 8B:
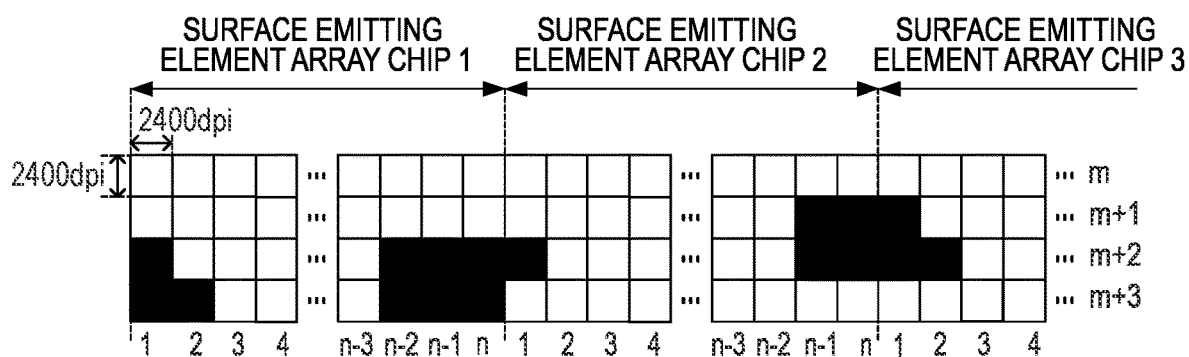
FIG. 8B is a diagram for illustrating the filtering process in the embodiment.
Figure 8C:
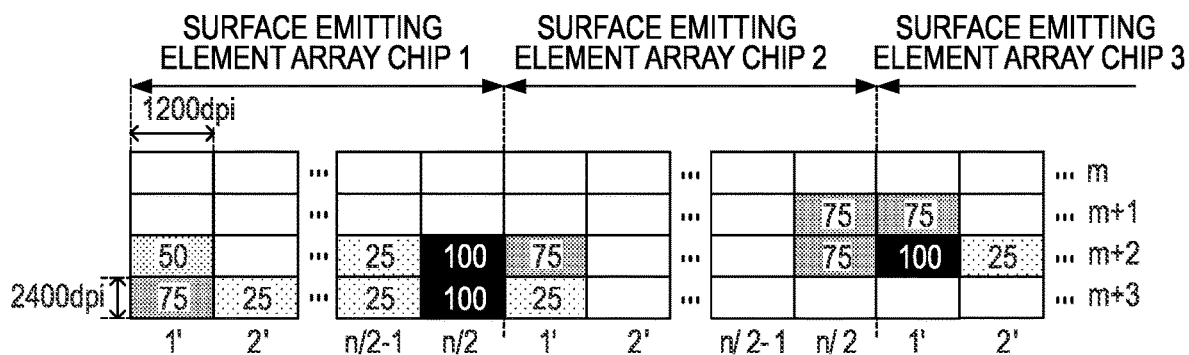
FIG. 8C is a diagram for illustrating the filtering process in the embodiment.

FIG. 8A to FIG. 8C are diagrams for illustrating a shift of the image data before and after the filtering process, and a change of the image data caused by the filtering process. FIG. 8A is a diagram for illustrating the image data at 2,400 dpi obtained after the image data generating portion 401 of the control circuit board 415 performs the dithering process for the surface emitting element array chips 1, 2, and 3. In FIG. 8A, the image data is illustrated in two tones of black and white. Further, the vertical axis of FIG. 8A represents the sub-scanning direction, and "m" to "m+3" indicate the lines in the sub-scanning direction. Further, the horizontal axis of FIG. 8A represents the main scanning direction, and 1, 2 ..., "n−1", and "n" indicate the array order at 2,400 dpi of the light emitting elements in the surface emitting element array chip. FIG. 8B is a diagram for illustrating the image data obtained after the image data illustrated in FIG. 8A is shifted by the line data shift portion 402 and the chip data shift portion 404 of the control circuit board 415 in units of 2,400 dpi. For simpler description, FIG. 8B shows an example of shifting an image by shifting the image data illustrated in FIG. 8A by one pixel to the left side in the main scanning direction, and shifting the image data corresponding to the surface emitting element array chip 1 by one pixel downward in the sub-scanning direction in array chip units.

FIG. 8C shows image data obtained after, with respect to the image shifted in the main scanning direction and the sub-scanning direction in FIG. 8B, the image data in the main scanning direction is subjected to resolution conversion of from 2,400 dpi to 1,200 dpi by the filtering processing portion 408 of the drive portion 303a of the exposure head 106. In the horizontal axis direction, 1', 2', . . . , "n/2−1", and "n" indicate the array order of the light emitting elements of the surface emitting element array chip after the resolution is converted into 1,200 dpi. Further, pixel positions of 1' and 2' after the resolution conversion of FIG. 8C correspond to pixel positions of 1 and 3 before the resolution conversion of FIG. 8B, and pixel positions of "n/2−1" and "n/2" after the resolution conversion of FIG. 8C correspond to pixel positions of "n−3" and "n−1" before the resolution conversion of FIG. 8B. The numbers in the pixels of FIG. 8C indicate density values of the pixels. In this embodiment, it is assumed that a process is performed using the number of tones of 8 bits after the resolution conversion. In FIG. 8C, in a case in which a density value of a black part is represented by 100% and a density value of a white part is represented by 0%, when density values of the pixels are calculated based on Expression 1 given above, the density values are expressed by five values of 0%, 25%, 50%, 75%, and 100%. When the process is performed with the number of tones of one pixel after the resolution conversion being set to 3 bits or more, a smooth process is allowed without causing a level difference in density.

For example, the density value of the pixel 1' in the row (m+3) of FIG. 8C is, through use of Expression 1 and the densities of the pixels of FIG. 8B, (Density value of pixel 1')=(Density of pixel 1 (1))×K1 (0.5)+(Density of pixel 2 (1))×K2 (0.25)=0.75 (75%). In this case, there is no array chip on the left side of the pixel 1, and hence the density of the pixel on the left side of the pixel 1 is not included in the calculation. Likewise, the density value of the pixel 2' in the row (m+3) of FIG. 8C is calculated as follows through use of Expression 1 and the densities of the pixels of FIG. 8B. That is, (Density value of pixel 2')=(Density of pixel 2 (1))×K2 (0.25)+(Density of pixel 3 (0))×K1 (0.5)+(Density of pixel 4 (0))×K2 (0.25)=0.25 (25%). Further, the density value of the pixel "n/2" in the row (m+3) of FIG. 8C is calculated as follows through use of Expression 1 and the densities of the pixels of FIG. 8B. That is, (Density value of pixel "n/2")=(Density of pixel "n−2" (1))×K1 (0.25)+(Density of pixel "n−1" (1))×K1 (0.5)+(Density of pixel "n" (1))×K2 (0.25)=1 (100%).

Further, while the filtering process is performed, in a case in which the process is performed on the pixel at the end portion of the surface emitting element array chip, when the pixel data of the adjacent surface emitting element array chip is absent, image lack and an image defect are caused. Accordingly, as described above, the chip data converting portion 403 of the control circuit board 415 obtains in advance an image data array in which the pixel data on the end portion side of the adjacent surface emitting element array chip is added. In this manner, the filtering process without image lack can be performed.

(LUT)

Subsequently, the LUT 410 performs data conversion of an image data value (density data value) for each of the pixels corresponding to the light emitting elements in the surface emitting element array chip with reference to a look-up table. The LUT 410 converts the data value for each of the pixels based on a response characteristic of a light emission time of each of the surface emitting element array chips such that an accumulated light amount at the time when pulsed light emission is performed has a predetermined value. For example, when a response of the light emission time of each of the surface emitting element array chips is slow and the accumulated light amount is smaller than a target value, the LUT 410 performs the data conversion so as to increase the data value. In this embodiment, it is assumed that the CPU 400 sets, before the image formation is started, values in a conversion table set in the look-up table to predetermined values that are based on experimentally-obtained response characteristics of each of the light emitting element arrays.

FIG. 20A to FIG. 20C are diagrams for illustrating examples of the look-up table. The LUT 410 uses any one of FIG. 20A to FIG. 20C to convert the pixel data equivalent to 1,200 dpi into a PWM signal. FIG. 20A to FIG. 20C each show a table for converting the pixel data equivalent to 1,200 dpi into 8-bit PWM data. In this case, "000, 001, 010, 011, and 100" are pixel data items equivalent to 1,200 dpi indicating "density 0%, density 25%, density 50%, density 75%, and density 100%," respectively. In the PWM data, "1" indicates ON data (light emitting data) of an LED, and "0" indicates OFF data (non-light emitting data) thereof. The PWM data corresponds to ΦW1 to ΦW4.

(PWM Signal Generating Portion, Timing Controller, Control Signal Generating Portion, and Drive Voltage Generating Portion)

Subsequently, the PWM signal generating portion 411 generates a pulse width signal (hereinafter referred to as "PWM signal") corresponding to the light emission time during which each of the surface emitting element array chips emits light in one pixel interval based on the data value for each of the pixels. The timing to output the PWM signal is controlled by the timing controller 412. The timing controller 412 generates a sync signal corresponding to the pixel interval of each of the pixels from the line sync signal generated from the sync signal generating portion 406 of the control circuit board 415 and outputs the sync signal to the PWM signal generating portion 411. The drive voltage generating portion 414 generates a drive voltage for driving each of the surface emitting element array chips in synchronization with the PWM signal. The drive voltage generating portion 414 has a configuration that allows the CPU 400 to adjust a voltage level of the output signal to around 5 V so as to achieve a predetermined light amount. In this embodiment, each of the surface emitting element array chips is configured to be able to simultaneously and independently drive the four light emitting elements. The drive voltage generating portion 414 supplies drive signals to four lines for each of the surface emitting element array chips, specifically, supplies the drive signals to 1 line (15 chips)×4=60 lines in the staggered configuration in the entire exposure head 106. It is assumed that the respective drive signals supplied to the individual surface emitting element array chips are represented by ΦW1 to ΦW4 (see FIG. 9). Meanwhile, through an operation of a shift thyristor (see FIG. 9), the individual surface emitting element array chips are sequentially driven. The control signal generating portion 413 generates, from the sync signal corresponding to the pixel interval, which is generated from the timing controller 412, control signals Φs, Φ1, and Φ2 for transferring a shift thyristor for each of the pixels (see FIG. 9).

[Description of SLED Circuit]

Figure 9:
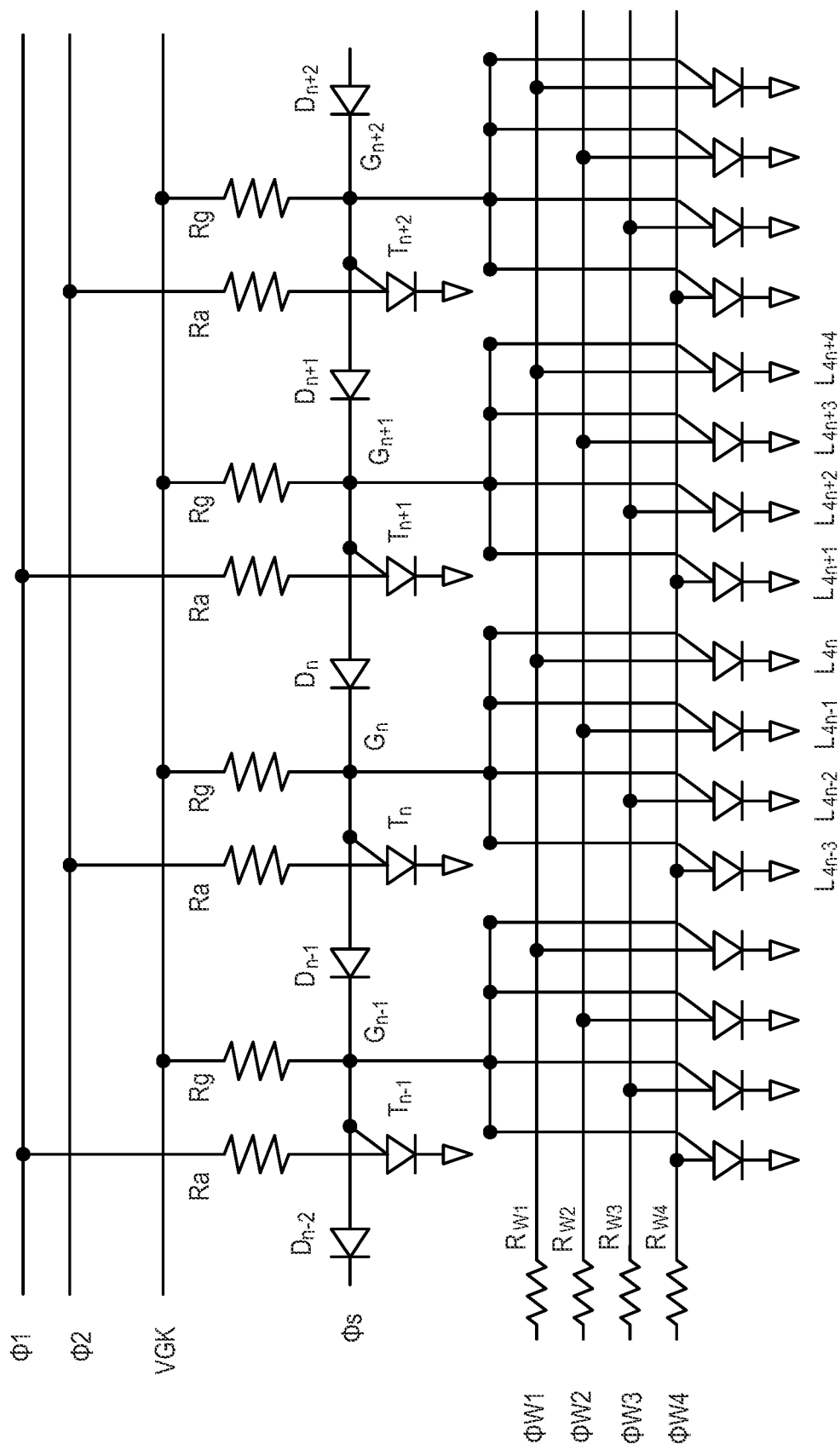
FIG. 9 is a diagram for illustrating an equivalent circuit of an extracted part of an array chip in the embodiment.

FIG. 9 is an illustration of an equivalent circuit of an extracted part of a self-scanning light emitting element (self-scanning LED: SLED) array chip in this embodiment. In FIG. 9, Ra and Rg indicate an anode resistor and a gate resistor, respectively, and Tn indicates a shift thyristor. Dn indicates a transfer diode, and Ln indicates a light emitting thyristor. Further, Gn indicates a common gate of a corresponding shift thyristor Tn and a light emitting thyristor Ln connected to the shift thyristor Tn. In this case, "n" is an integer of 2 or more. Φ1 indicates a transfer line for odd-numbered shift thyristors T, and Φ2 indicates a transfer line for even-numbered shift thyristors T. ΦW1 to ΦW4 indicate lighting signal lines for the light emitting thyristors L, and are connected to resistors RW1 to RW4, respectively. VGK indicates a gate line, and Φs indicates a start pulse line. As illustrated in FIG. 9, four light emitting thyristors of from L4n−3 to L4n are connected to one shift thyristor Tn, and the four light emitting thyristors L4n−3 to L4n can be simultaneously turned on.

[Operation of SLED Circuit]

Next, the operation of the SLED circuit illustrated in FIG. 9 is described. In the circuit diagram of FIG. 9, it is assumed that a voltage of 5 V is applied to the gate line VGK, and voltages input to the transfer lines Φ1 and Φ2 and the lighting signal lines ΦW1 to ΦW4 are also 5 V. In FIG. 9, when the shift thyristor Tn is in an ON state, the potential of the common gate Gn of the shift thyristor Tn and the light emitting thyristor Ln connected to the shift thyristor Tn is reduced to about 0.2 V. The common gate Gn of the light emitting thyristor Ln and the common gate Gn+1 of the light emitting thyristor Ln+1 are connected to each other by a coupling diode Dn, and hence a potential difference substantially equal to a diffusion potential of the coupling diode Dn is generated. In this embodiment, the diffusion potential of the coupling diode Dn is about 1.5 V, and hence the potential of the common gate Gn+1 of the light emitting thyristor Ln+1 is 1.7 V (=0.2 V+1.5 V) which is the sum of the diffusion potential of 1.5 V and the potential of the common gate Gn of the light emitting thyristor Ln of 0.2 V. Likewise, the potential of the common gate Gn+2 of the light emitting thyristor Ln+2 is 3.2 V (=1.7 V+1.5 V), and the potential of the common gate Gn+3 (not shown) of the light emitting thyristor Ln+3 (not shown) is 4.7 V (=3.2 V+1.5 V). The potential is 5 V in the common gate Gn+4 of the light emitting thyristor Ln+4 and the subsequent common gates because the voltage of the gate line VGK is 5 V, and thus the potential cannot be higher than 5 V. Further, the potential of the common gate Gn−1 prior to the common gate Gn of the light emitting thyristor Ln (left side of the common gate Gn of FIG. 9) is 5 V because the coupling diode Dn−1 is in a reverse bias state, and thus the voltage of the gate line VGK is applied without drop.

Figure 10A:
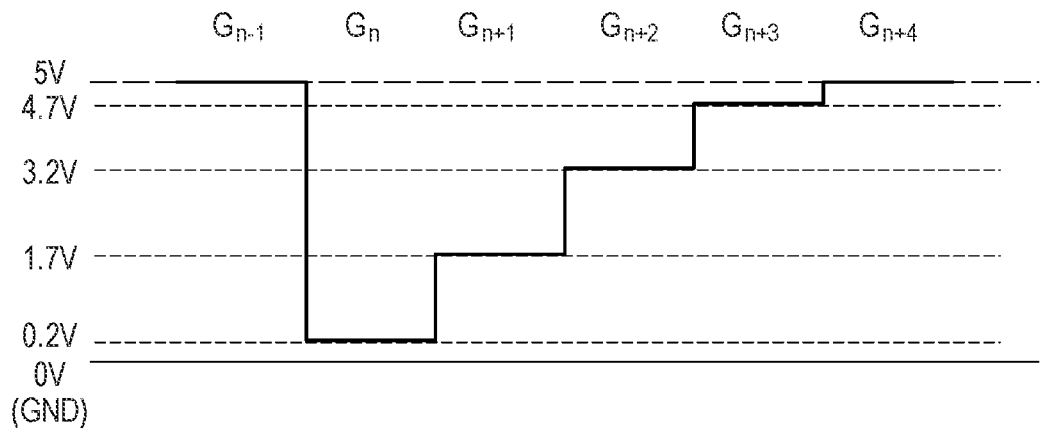
FIG. 10A is a graph for showing a distribution state of a gate potential of a shift thyristor in the embodiment.

FIG. 10A is a graph for showing a distribution of a gate potential of the common gate Gn of each of the light emitting thyristors Ln when the above-mentioned shift thyristor Tn is in the ON state. Common gates Gn−1, Gn, Gn+1 . . . indicate common gates of the light emitting thyristors L of FIG. 9. Further, the vertical axis of FIG. 10A represents a gate potential. A voltage required for turning on each of the shift thyristors Tn (hereinafter referred to as "threshold value voltage") has substantially the same potential as that obtained by adding the diffusion potential (1.5 V) to the gate potential of the common gate Gn of each of the light emitting thyristors Ln. When the shift thyristor Tn is in the ON state, among the shift thyristors connected to the same transfer line Φ2 as that of the shift thyristor Tn, the shift thyristor Tn+2 has the lowest common gate potential. As described above, the potential of the common gate Gn+2 of the light emitting thyristor Ln+2 connected to the shift thyristor Tn+2 is 3.2 V (=1.7 V+1.5 V) (FIG. 10A). Thus, the threshold value voltage of the shift thyristor Tn+2 is 4.7 V (=3.2 V+1.5 V). However, the shift thyristor Tn is in the ON state, and hence the potential of the transfer line Φ2 is drawn to about 1.5 V (diffusion potential), and thus becomes lower than the threshold value voltage of the shift thyristor Tn+2. Thus, the shift thyristor Tn+2 cannot be turned on. Other shift thyristors connected to the same transfer line Φ2 have higher threshold value voltages than that of the shift thyristor Tn+2, and hence cannot be turned on as well. Only the shift thyristor Tn can be maintained in the ON state.

Figure 10B:
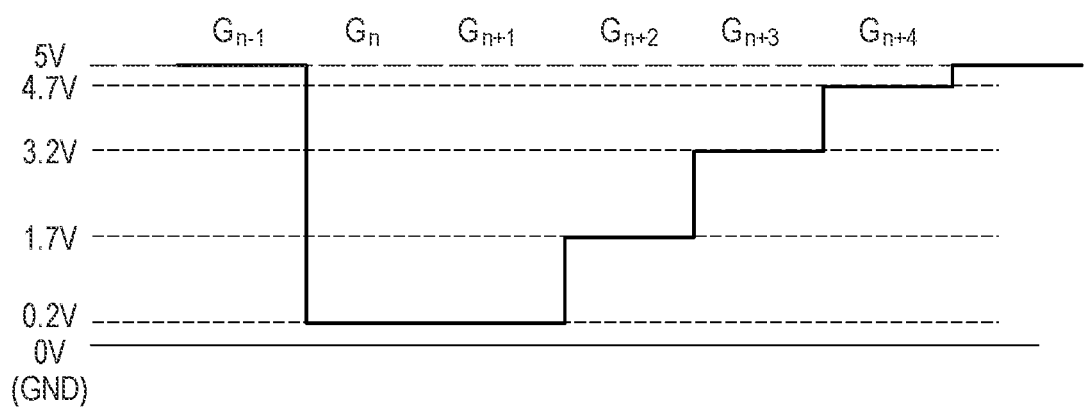
FIG. 10B is a graph for showing a distribution state of the gate potential of the shift thyristor in the embodiment.
Figure 10C:
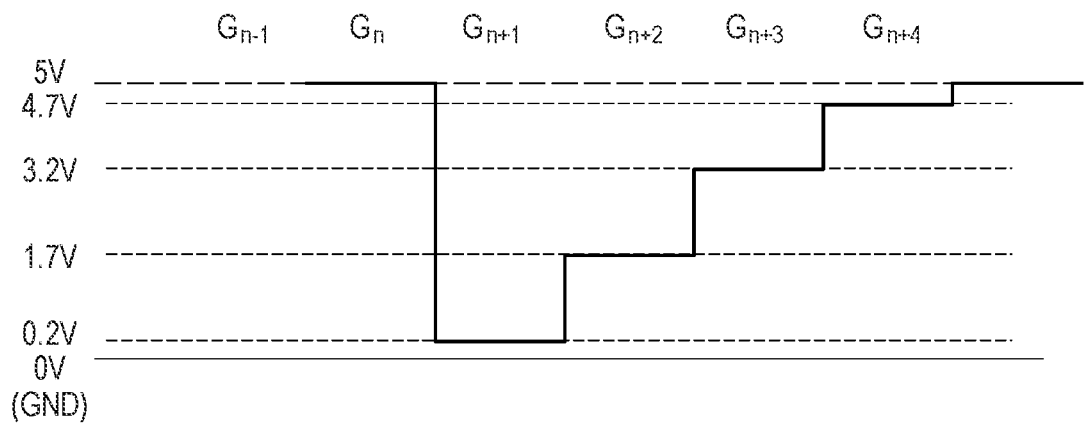
FIG. 10C is a graph for showing a distribution state of the gate potential of the shift thyristor in the embodiment.

Further, with regard to the shift thyristors connected to the transfer line Φ1, the threshold value voltage of the shift thyristor Tn+1 having the lowest threshold value voltage is 3.2 V (=1.7 V+1.5 V). Further, the threshold value voltage of the shift thyristor Tn+3 having the second lowest threshold value voltage (not shown in FIG. 9) is 6.2 V (=4.7 V+1.5 V). When a voltage of 5 V is input to the transfer line Φ1 under this state, only the shift thyristor Tn+1 can transition to the ON state. This state corresponds to a state in which the shift thyristor Tn and the shift thyristor Tn+1 are simultaneously in the ON state. Accordingly, the gate potentials of the shift thyristors Tn+2, Tn+3, and the like provided on the right side of the shift thyristor Tn+1 in the circuit diagram of FIG. 9 are each reduced by the amount of the diffusion potential (1.5 V). However, the voltage of the gate line VGK is 5 V, and the voltage of the common gate of the light emitting thyristor L is limited by the voltage of the gate line VGK, and hence the gate potentials of the shift thyristors on the right side of the shift thyristor Tn+5 are 5 V. FIG. 10B is a graph for showing a gate voltage distribution of the common gates Gn−1 to Gn+4 at this time, and the vertical axis represents a gate potential. When the potential of the transfer line Φ2 is decreased to 0 V under this state, the shift thyristor Tn is turned off, and the potential of the common gate Gn of the shift thyristor Tn is increased to the VGK potential. FIG. 10C is a graph for showing a gate voltage distribution at this time, and the vertical axis represents a gate potential. In this manner, the transfer of the ON state from the shift thyristor Tn to the shift thyristor Tn+1 is completed.

[Light Emitting Operation of Light Emitting Thyristor]

Next, a light emitting operation of the light emitting thyristor is described. When only the shift thyristor Tn is turned on, the gates of the four light emitting thyristors of from L4n−3 to L4n are connected in common to the common gate Gn of the shift thyristor Tn. Accordingly, the gate potentials of the light emitting thyristors L4n−3 to L4n are equal to that of the common gate Gn, that is, 0.2 V. Thus, the threshold value of each of the light emitting thyristors is 1.7 V (=0.2 V+1.5 V), and the light emitting thyristors L4n−3 to L4n can be turned on when a voltage of 1.7 V or more is input thereto from the lighting signal lines ΦW1 to ΦW4 for the light emitting thyristors. Thus, when the shift thyristor Tn is turned on, lighting signals are input to the lighting signal lines ΦW1 to ΦW4 so that the four light emitting thyristors L4n−3 to L4n in any combination can be selectively caused to emit light. At this time, the potential of the common gate Gn+1 of the shift thyristor Tn+1 adjacent to the shift thyristor Tn is 1.7 V, and the threshold value voltages of the light emitting thyristors L4n+1 to L4n+4 gate-connected to the common gate Gn+1 are 3.2 V (=1.7 V+1.5 V). The lighting signals input from the lighting signal lines ΦW1 to ΦW4 are 5 V, and hence also the light emitting thyristors L4n+1 to L4n+4 seem to be turned on by the same lighting pattern as the lighting pattern of the light emitting thyristors L4n−3 to L4n. However, the light emitting thyristors L4n−3 to L4n have lower threshold value voltages, and are thus turned on earlier than the light emitting thyristors L4n+1 to L4n+4 when the lighting signals are input from the lighting signal lines ΦW1 to ΦW4. Once the light emitting thyristors L4n−3 to L4n are turned on, the connected lighting signal lines ΦW1 to ΦW4 are drawn to about 1.5 V (diffusion potential). Accordingly, the potentials of the lighting signal lines ΦW1 to ΦW4 become lower than the threshold value voltages of the light emitting thyristors L4n+1 to L4n+4, and hence the light emitting thyristors L4n+1 to L4n+4 cannot be turned on. As described above, when a plurality of light emitting thyristors L are connected to one shift thyristor T, the plurality of light emitting thyristors L can be simultaneously turned on.

Figure 11:
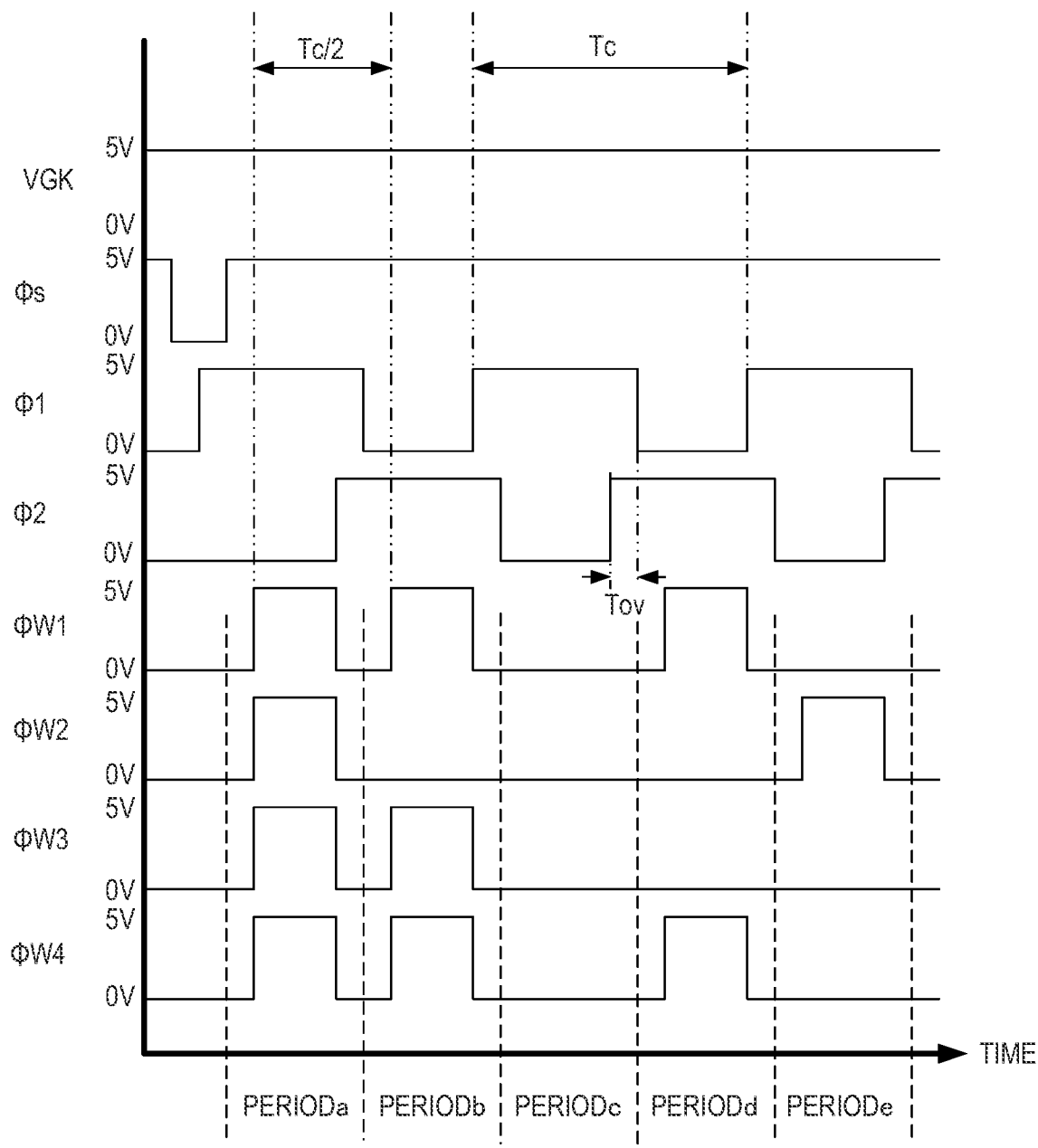
FIG. 11 is a graph for showing drive signal waveforms of the surface emitting element array chip in the embodiment.

FIG. 11 is a timing chart of drive signals for the SLED circuit illustrated in FIG. 9. FIG. 11 shows, in order from the top, voltage waveforms of the drive signals of the gate line VGK, the start pulse line Φs, the transfer lines Φ1 and Φ2 for the odd-numbered and even-numbered shift thyristors, and the lighting signal lines ΦW1 to ΦW4 for the light emitting thyristors. Each of the drive signals has a voltage of 5 V in the ON state, and a voltage of 0 V in the OFF state. Further, the horizontal axis of FIG. 11 represents time. Further, Tc indicates a cycle time of the clock signal Φ1, and Tc/2 indicates a cycle time corresponding to half (=½) of the cycle time Tc.

The gate line VGK is always supplied with a voltage of 5 V. Further, the clock signal Φ1 for the odd-numbered shift thyristors and the clock signal Φ2 for the even-numbered shift thyristors are input at the same cycle time Tc, and the start pulse line supplies the signal Φs of 5 V. Slightly before the clock signal Φ1 for the odd-numbered shift thyristors first becomes 5 V, the signal Φs of the start pulse line is dropped to 0 V in order to provide a potential difference to the gate line VGK. In this manner, the gate potential of the first shift thyristor Tn−1 is drawn from 5 V to 1.7 V, and the threshold value voltage becomes 3.2 V so that the shift thyristor Tn−1 can be turned on by the signal from the transfer line Φ1. Slightly after a voltage of 5 V is applied to the transfer line Φ1 and the first shift thyristor Tn−1 transitions to the ON state, a voltage of 5 V is supplied to the start pulse line Φs. A voltage of 5 V is thereafter continuously supplied to the start pulse line Φs.

The transfer line Φ1 and the transfer line Φ2 are configured to have a time period Tov of the overlapped ON state (in this case, 5 V) and have a substantially complementary relationship. A signal is transmitted to each of the lighting signal lines ΦW1 to ΦW4 for turning on the light emitting thyristor at a cycle time that is half of the cycle time of the transfer lines Φ1 and Φ2, and the light emitting thyristor is turned on when a voltage of 5 V is applied when the corresponding shift thyristor is in the ON state. For example, in a period "a", all of the four light emitting thyristors connected to the same shift thyristor are in the ON state, and in a period "b", three light emitting thyristors are simultaneously in the ON state. Further, in a period "c", all of the light emitting thyristor are in the OFF state, and in a period "d", two light emitting thyristors are simultaneously in the ON state. In a period "e", only one light emitting thyristor is in the ON state.

In this embodiment, the number of light emitting thyristors connected to one shift thyristor is 4, but the present invention is not limited thereto. The number may be smaller or larger than 4 depending on applications. The circuit described above is a circuit having a common cathode for the thyristors, but even a circuit having a common anode is applicable by inverting the polarities as appropriate.

[Structure of Surface Emitting Thyristor]

Figure 12A:
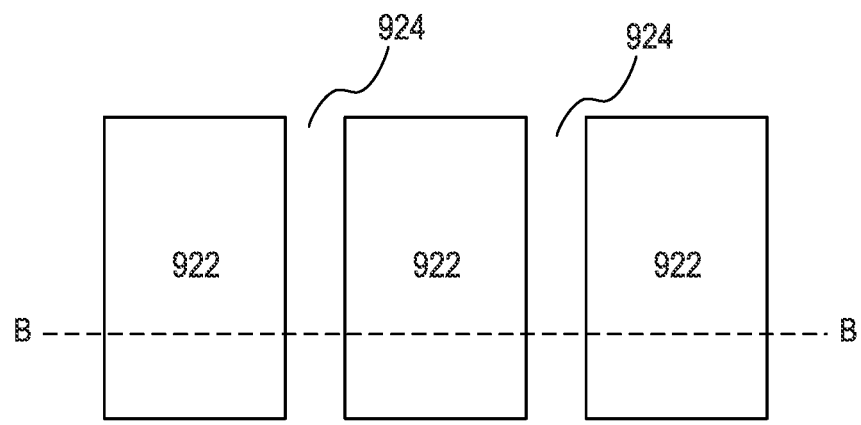
FIG. 12A is a view for illustrating surface emitting thyristors in the embodiment.
Figure 12B:
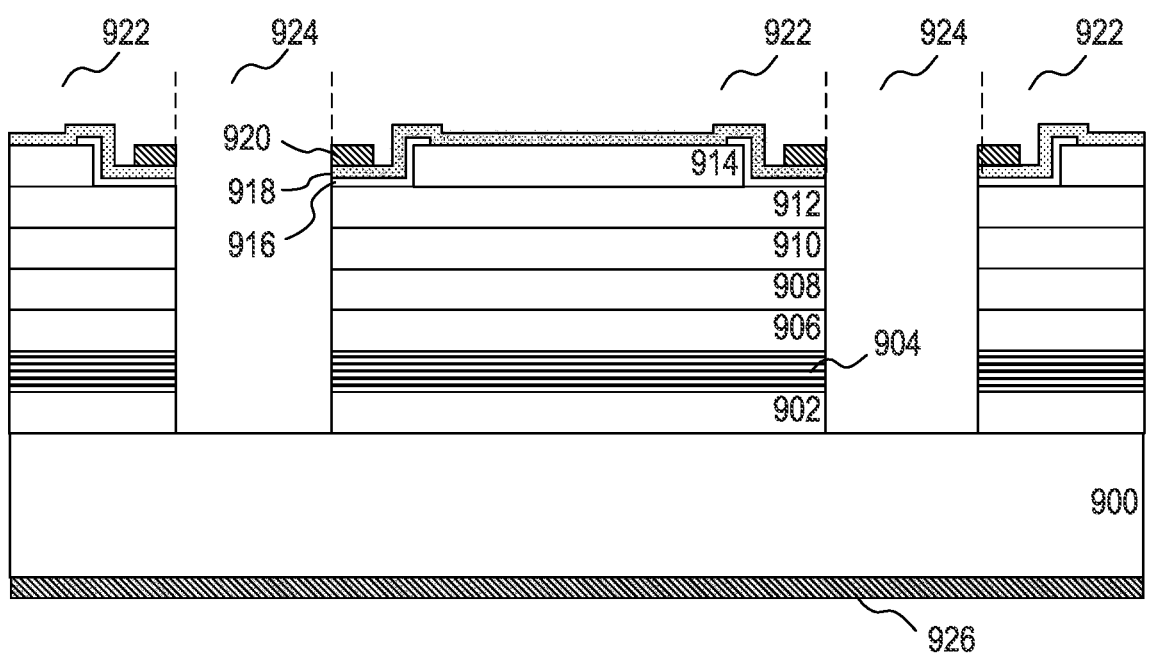
FIG. 12B is a view for illustrating a cross section of the surface emitting thyristors in the embodiment.

FIG. 12A and FIG. 12B are schematic views for illustrating a surface emitting thyristor portion in this embodiment.

FIG. 12A is a plan view (schematic view) for illustrating a light emitting element array in which a plurality of light emitting elements formed into mesa (trapezoid) structures 922 are arrayed. FIG. 12B is a schematic cross-sectional view of the light emitting elements formed into the mesa structures 922, taken along the line B-B of FIG. 12A. The mesa structures 922 into which the light emitting elements are formed are arranged at predetermined pitches (intervals between the light emitting elements) (for example, about 21.16 μm in the case of a resolution of 1,200 dpi), and the mesa structures 922 are separated apart from each other by element isolation grooves 924.

FIG. 12B shows a first-conductivity-type compound semiconductor substrate 900, a first-conductivity-type buffer layer 902 having the same conductivity type as that of the substrate 900, and a first-conductivity-type distribution Bragg reflection (DBR) layer 904 formed by laminating two types of semiconductor layers. FIG. 12B further shows a first first-conductivity-type semiconductor layer 906, a first second-conductivity-type semiconductor layer 908 having a conductivity type different from the first conductivity type, a second first-conductivity-type semiconductor layer 910, and a second second-conductivity-type semiconductor layer 912. As illustrated in FIG. 12B, the semiconductor layers 906, 908, 910, and 912 being semiconductors having different conductivity types are alternately laminated to form a pnpn-type (or npnp-type) thyristor structure. In this embodiment, an n-type GaAs substrate is used as the substrate 900, and an n-type GaAs layer or n-type AlGaAs layer is used as the buffer layer 902. The DBR layer 904 has a laminate structure of n-type AlGaAs having a high Al composition and n-type AlGaAs having a low Al composition. As the first first-conductivity-type semiconductor layer 906 formed on the DBR layer, n-type AlGaAs is used, and as the first second-conductivity-type semiconductor layer 908, p-type AlGaAs is used. As the second first-conductivity-type semiconductor layer 910, n-type AlGaAs is used, and as the second second-conductivity-type semiconductor layer 912, p-type AlGaAs is used.

Further, the surface emitting elements of the mesa structure type use a current confinement mechanism to prevent a current from flowing to side surfaces of the mesa structures 922, thereby improving the light emitting efficiency. Now, the current confinement mechanism in this embodiment is described. As illustrated in FIG. 12B, in this embodiment, on the p-type AlGaAs being the second second-conductivity-type semiconductor layer 912, a p-type GaP layer 914 is formed, and further thereon, an n-type transparent conductor being an ITO layer 918 is formed. The p-type GaP layer 914 is formed so that a part to be brought into contact with the ITO layer 918 being the transparent conductor has a sufficiently high impurity concentration. When a forward bias is applied to the light emitting thyristor (for example, when a back-surface electrode 926 is grounded, and a positive voltage is applied to a front-surface electrode 920), the p-type GaP layer 914 forms a tunnel junction because the part to be brought into contact with the ITO layer 918 being the transparent conductor is formed to have a sufficiently high impurity concentration. As a result, current flows. With such a structure, the p-type GaP layer 914 concentrates a current in the part in contact with the ITO layer 918 being the n-type transparent conductor, to thereby form the current confinement mechanism. In this embodiment, an interlayer insulating layer 916 is provided between the ITO layer 918 and the p-type AlGaAs layer 912. However, an attached diode formed by the n-type ITO layer 918 and the p-type AlGaAs layer 912 has a reverse bias with respect to the forward bias of the light emitting thyristor, and a current does not basically flow in the case of the forward bias except for the tunnel junction portion. Accordingly, when the attached diode formed by the n-type ITO layer 918 and the p-type AlGaAs layer 912 has a sufficient reverse-direction withstanding voltage with respect to the required application, the interlayer insulating layer 916 can be omitted. With such a configuration, a semiconductor laminating portion below a part substantially equal to a part in which the p-type GaP layer 914 and the ITO layer 918 being the n-type transparent conductor are in contact with each other emits light, and the light emission is almost entirely reflected by the DBR layer 904 to the opposite side of the substrate 900.

In the exposure head 106 in this embodiment, the density of the luminous points (interval between the light emitting elements) is determined based on a resolution. The individual light emitting elements inside the surface emitting element array chip are separated by the element isolation grooves 924 to have the mesa structures 922. For example, when image formation is performed at a resolution of 1,200 dpi, the light emitting elements are arrayed so that an interval between element centers of adjacent light emitting elements (luminous points) is 21.16 µm.

In this embodiment described above, dithering at 2,400 dpi is performed with respect to the light emitting element interval of 1,200 dpi, and the image data is shifted depending on a color misregistration amount or a mounting misregistration amount. In this manner, image position control at a higher resolution is allowed, and high-quality image formation with less misregistration is allowed with respect to the color misregistration or the mounting misregistration of the surface emitting element array chip. Further, when the chip data converting portion 403 of the control circuit board 415 obtains the image data array for each of the surface emitting element array chips, the image data of the adjacent chip is added to the image data, and the obtained data is transmitted to the subsequent-stage filtering processing portion 408. In this manner, when the filtering processing portion 408 performs the resolution conversion, high-quality image formation without image lack between the surface emitting element array chips is allowed. In this embodiment, the example in which the surface emitting element array chips are arranged in two rows in a staggered configuration is described, but similar processing is allowed also in a configuration in which the surface emitting element array chips are arrayed in one row, thereby being capable of obtaining similar effects as those in the case in which the surface emitting element array chips are arrayed in two rows. Further, even in the case of an exposure head in which the surface light emitting elements have a pitch of 600 dpi, the resolution of the dithering process and the image shifting process may be increased (for example, to 1,200 dpi or 2,400 dpi) so that position control is allowed at a resolution equal to or larger than the pitch of the light emitting elements.

In such a resolution conversion method in which the data of adjacent pixels is interpolated by the filtering process, the positional accuracy of a dot (image) to be formed is improved. On the other hand, a latent image at an edge portion is liable to become unstable due to a large amount of multi-value halftone data being generated at an edge portion in the main scanning direction of the dot (image). Accordingly, a phenomenon that the sharpness of an image to be formed is reduced may occur depending on image forming conditions (for example, charging amount of the photosensitive drum 102). In view of the above, description is given of an image forming apparatus which is configured to perform resolution conversion and has a configuration in which a sharpness priority mode can be selected in accordance with an image type or an instruction from a user. In this embodiment, it is assumed that an image controller selects the sharpness priority mode based on the image type. Further, it is assumed that the image forming apparatus of this embodiment includes an operation portion (not shown), and that a user can set the sharpness priority mode through the operation portion.

In this embodiment, as described later, the filtering processing portion 408 of the drive portion 303a of the exposure head 106 is notified of changes of the filter coefficients K1 and K2 from the CPU 400 of the control circuit board 415. Accordingly, in this embodiment, in the drive portion 303a of FIG. 4, a signal line for notification of an instruction from the CPU 400 is also provided to the filtering processing portion 408.

In this embodiment, when the sharpness priority mode corresponding to a second process is selected, the values of the filter coefficients K1 and K2 to be used in the filtering arithmetic operation (Expression 1) performed by the filtering processing portion 408 are switched to K1=1.0 and K2=0. Switching of the values of the filter coefficients K1 and K2 is performed by rewriting the settings of K1 and K2 in the filtering processing portion 408 in response to an instruction from the CPU 400 of the control circuit board 415. As a result of the filter coefficient K2 corresponding to the adjacent pixel becoming 0, Expression 1 for calculating image data of each pixel becomes Expression 2 given below, and the input data at the same main scanning position as that of the output data is calculated as it is as the output data.

$$Dn' = D(2 \times n) \qquad \text{(Expression 2)}$$

Figure 13:
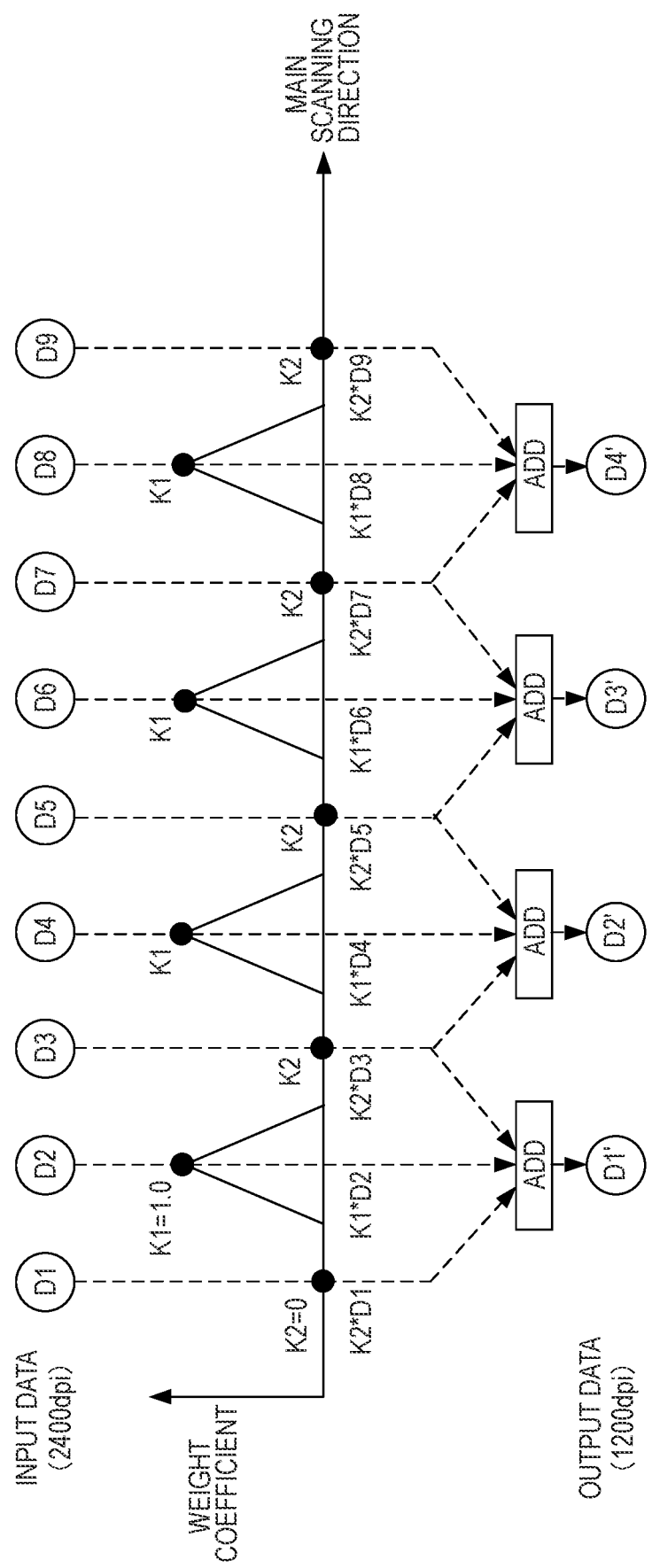
FIG. 13 is a diagram for illustrating the filtering process in the embodiment.

In Expression 2, "n" corresponds to 516 which is the number of light emitting elements in each of the surface emitting element array chips, and, based on the order in which the light emitting elements are turned on, an arithmetic operation of the image data for each of the light emitting elements is sequentially performed in the order of n=1 to 516. In the case of Expression 2, the odd-numbered input data items D1, D3, D5, D7, and D9 of FIG. 13 are not reflected in output data items D1' to D4' and are omitted. Accordingly, when the sharpness priority mode is selected, image generation is performed such that the image data generated by the image data generating portion 401 undergoes dot growth in units of two pixels in the main scanning direction.

Figure 14A:
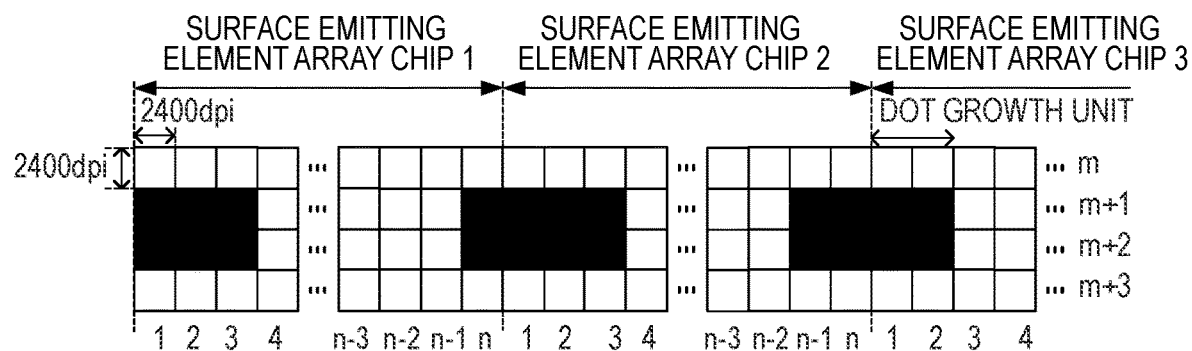
FIG. 14A is a diagram for illustrating the filtering process in the embodiment.

FIG. 14A is a diagram for illustrating image data obtained when the dithering process is performed for the surface emitting element array chips 1, 2 and 3 by the image data generating portion 401 of the control circuit board 415 in units of two pixels in the main scanning direction. In the example of FIG. 14A, dots each having a size of four pixels in the main scanning direction and two pixels in the sub-scanning direction are formed. In this embodiment, when one dot is formed, a dither matrix is determined such that the width of pixels in the main scanning direction undergoes dot growth in units of two pixels in the manner of 2, 4, 6, 8 . . . . In FIG. 14A, the image data is illustrated in two tones of black and white. Further, the vertical axis of FIG. 14A represents the sub-scanning direction, and "m" to "m+3" indicate the lines in the sub-scanning direction. Further, the horizontal axis of FIG. 14A represents the main scanning direction, and 1, 2 . . . , "n−1", and "n" indicate the array order at 2,400 dpi of the light emitting elements in the surface emitting element array chip.

Figure 14B:
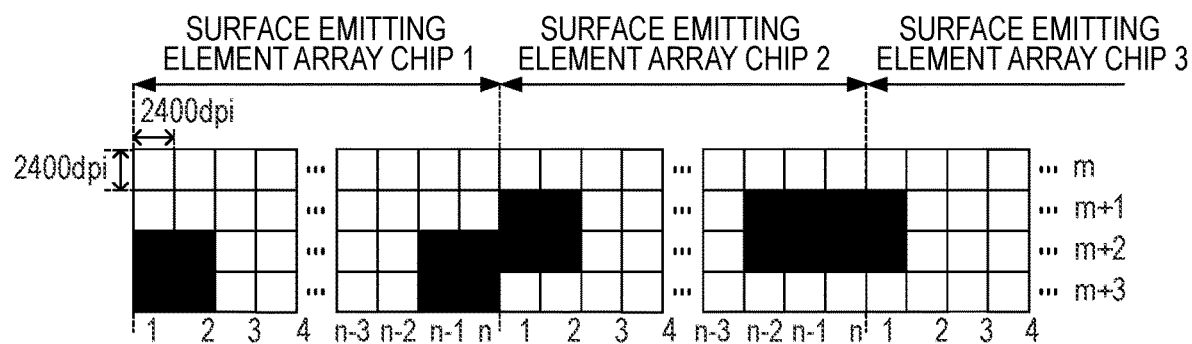
FIG. 14B is a diagram for illustrating the filtering process in the embodiment.
Figure 14C:
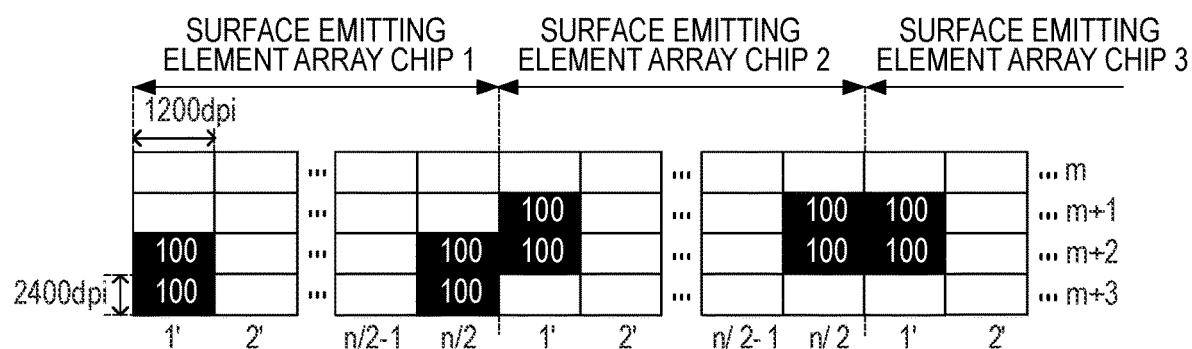
FIG. 14C is a diagram for illustrating the filtering process in the embodiment.

FIG. 14B is a diagram for illustrating the image data obtained after the image data illustrated in FIG. 14A is shifted by the line data shift portion 402 and the chip data shift portion 404 of the control circuit board 415 in units of 2,400 dpi as in the above-mentioned example. FIG. 14B shows an example of shifting an image by shifting the image data illustrated in FIG. 14A by one pixel to the left side in the main scanning direction, and shifting the image data corresponding to the surface emitting element array chip 1 by one pixel downward in the sub-scanning direction in array chip units. FIG. 14C shows image data obtained after, with respect to the image shifted in the main scanning direction and the sub-scanning direction in FIG. 14B, the image data in the main scanning direction is subjected to resolution conversion of from 2,400 dpi to 1,200 dpi by the filtering processing portion 408 based on Expression 2. In the horizontal axis direction, 1', 2', . . . , "n/2−1", and "n" indicate the array order of the light emitting elements of the surface emitting element array chip after the resolution is converted into 1,200 dpi. Further, pixel positions of 1' and 2' of FIG. 14C correspond to pixel positions of 1 and 3 of FIG. 14B, and pixel positions of "n/2−1" and "n/2" of FIG. 14C correspond to pixel positions of "n−3" and "n−1" of FIG. 14B. The numbers in the pixels of FIG. 14C indicate density values of the pixels. As illustrated in FIG. 14C, in this embodiment, halftone data in which the image density is 75%, 50% or 25% as illustrated in FIG. 8C is not generated, and the tones after the process take one of two values (100% or 0%).

In the sharpness priority mode, the density data after the filtering process is binary (black or white), and hence a sharp latent image can be formed particularly at the edge portion of the image. Meanwhile, with regard to the movement accuracy of the image centroid, the image data is only moved in units of 1,200 dpi, and hence the movement accuracy of the image position is decreased. Thus, the CPU 400 performs the switching of the filtering process described above depending on the image characteristic, in accordance with the image type input to the control circuit board 415. For example, in a case in which a text or a line image is input, the CPU 400 switches to the sharpness priority mode to form a sharp image. Meanwhile, in a case in which a color image is input, the CPU 400 switches to an image position priority mode to form an image with a reduced color misregistration. In this case, it is assumed that, in the image position priority mode, the filter coefficients K1=0.5 and K2=0.25 described above are used.

Further, the above-mentioned switching of the filtering process may be switching in accordance with a change in the image forming conditions other than the image type. It is known that, in a case of an electrophotographic printer, the triboelectricity (electric charge amount) of toner decreases under a high-temperature, high-humidity environment, and as a result, developing performance and transferring performance are reduced to cause toner scattering at image edge portions. As a countermeasure against such a decrease in the triboelectricity, there is available a method of performing control for keeping the image density constant by lowering the charging amount to the photosensitive drum and the output light amount of the exposure head. The image position priority mode is selected before the triboelectricity of the toner decreases, and the sharpness priority mode is selected after the triboelectricity decreases. In this manner, a deterioration in the sharpness of the image edge portions can be moderated.

In this embodiment, the method of switching the filter coefficients between the image position priority mode (K1=0.5 and K2=0.25) and the sharpness priority mode (K1=1 and K2=0) is described, but it is not necessarily required to use the above-mentioned values as the coefficient values of the coefficients K1 and K2. Coefficient values satisfying Expression 3 and Expression 4 given below may be used.

(K1 value of sharpness priority mode)>(K1 value of image position priority mode)   (Expression 3)

(K2 value of sharpness priority mode)>(K2 value of image position priority mode)   (Expression 4)

As described above, in this embodiment, through switching of the settings of the image data generating portion 401 and the filtering processing portion 408, selection of the sharpness priority mode and the image position priority mode is allowed by a simple method. As a result, output of an optimal image is allowed through switching in accordance with the image type and the image forming conditions of the image forming apparatus.

[Relationship Between Position of Joint Portion and Streak]

As described above with reference to FIG. 3A to FIG. 3C, the N-th (N is an integer of 1 or more) surface emitting element array chip and the (N+1)-th surface emitting element array chip have an overlapping portion in the main scanning direction (longitudinal direction). In the following, this overlapping portion is referred to as "joint" between chips of surface emitting element rows. FIG. 15 is a view for illustrating a relationship between a joint between the individual surface emitting element array chips and an image (halftone) to be formed. An upper part of FIG. 15 shows the surface emitting element array chips 1 to 3 and the joint portions between the individual surface emitting element array chips, and a lower part of FIG. 15 shows an image to be formed by the surface emitting element array chips 1 to 3. The joint between the surface emitting element array chips corresponds to a misregistration amount caused due to variations (mounting error) at the time when the surface emitting element arrays are mounted to the drive circuit board 202, and is caused in units of several microns, for example. It is assumed that the mounting error in this embodiment is less than one pixel (21.16 µm) at 1,200 dpi. However, the mounting error is dependent on the technology of mounting the surface emitting element arrays onto the drive circuit board 202 and the array intervals of the surface emitting elements. Accordingly, there is also assumed a case in which the mounting error becomes equal to or larger than one pixel (21.16 µm) at 1,200 dpi. An ideal (desired) overlap between the surface emitting element array chips is expressed as follows. An ideal distance in the longitudinal direction from the center of, for example, the 512th light emitting element of the surface emitting element array chip to the center of the 1st light emitting element of the next surface emitting element array chip is represented by "c", and is referred to as "surface emitting element interval c" (center-to-center distance of surface emitting elements).

A joint portion A between the surface emitting element array chip 1 and the surface emitting element array chip 2 corresponds to a case of an interval smaller than the desired surface emitting element interval "c" (c>a). When a surface emitting element interval "a" at the joint portion A satisfies a condition of c>a, misregistration occurs such that the surface emitting elements at the end portions overlap each other. Thus, the light amount at the time when the surface emitting elements are caused to emit light at the position of the joint portion A is increased as compared to that in the case of the ideal surface emitting element interval "c", and an image having a high density is formed. That is, a part of an exposure range (one pixel) of the surface emitting element positioned on the rightmost side of the surface emitting element array chip 1 overlaps with a part of an exposure range (one pixel) of the surface emitting element positioned on the leftmost side of the surface emitting element array chip 2. Accordingly, an exposure amount of a part exposed in an overlapping manner is increased as compared to that in the case in which the surface emitting element array chips are ideally mounted on the printed circuit board. Thus, the image at the joint is formed at a density higher than the desired density. As a result, as illustrated in FIG. 15, an image is formed as a black streak.

Further, a joint portion B between the surface emitting element array chip 2 and the surface emitting element array chip 2 corresponds to a case of an interval larger than the desired surface emitting element interval "c" (c<b). When a surface emitting element interval "b" at the joint portion B satisfies a condition of c<b, misregistration occurs such that the surface emitting elements at the end portions separate from each other. Thus, the light amount at the time when the surface emitting elements are caused to emit light at the position of the joint portion B is decreased as compared to that in the case of the ideal surface emitting element interval "c", and an image having a low density is formed. That is, the center-to-center distance between the surface emitting element positioned on the rightmost side of the center surface emitting element array chip 2 and the surface emitting element positioned on the leftmost side of the surface emitting element array chip 2 is larger than the nominal value. Accordingly, an exposure amount of the above-mentioned part is decreased as compared to that in the case in which the surface emitting element array chips are ideally mounted on the printed circuit board. Thus, the image at the joint is formed at a density lower than the desired density. As a result, as illustrated in FIG. 15, an image is formed as a white streak.

As described above, an image is formed as a streak when the surface emitting element interval deviates from an ideal interval. Accordingly, a process of correcting the misregistration at the joint portion between the surface emitting element array chips is required. Now, how to perform, with respect to the image data, correction of the misregistration at the joint portion between the surface emitting element array chips is described. The correction of the misregistration at the joint portion between the surface emitting element array chips performed with respect to the image data is referred to as "joint correction."

[Correction of Misregistration at Joint Portion]

Figure 16:
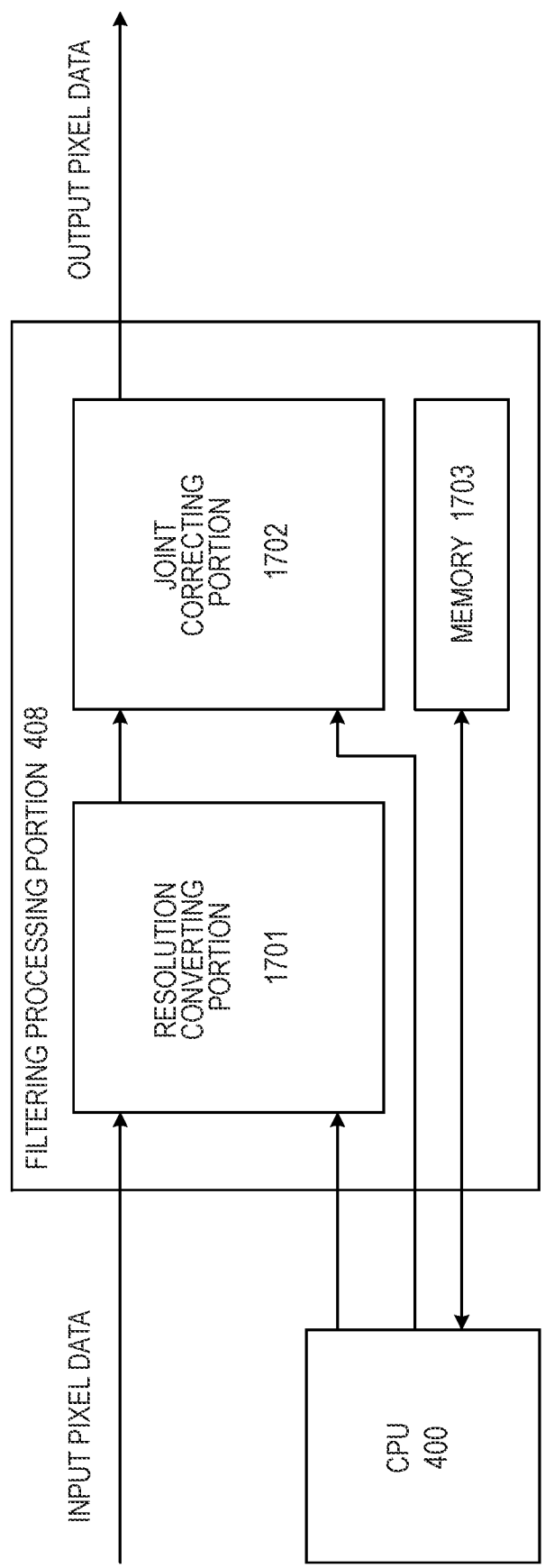
FIG. 16 is a block diagram of a filtering processing portion in the embodiment.

FIG. 16 is a diagram for illustrating blocks configured to perform joint correction of the surface emitting element array chips. That is, FIG. 16 is a diagram for illustrating a configuration of the filtering processing portion 408 of the drive portion 303a illustrated in FIG. 4. The filtering processing portion 408 includes a resolution converting portion 1701 serving as a conversion unit, a joint correcting portion 1702 serving as a first correction unit, and a memory 1703. The resolution converting portion 1701 of the filtering processing portion 408 converts the resolution with respect to the pixel data (input pixel data) input from the data receiving portion 407. The joint correcting portion 1702 receives as input the multi-value pixel data whose resolution is converted by the resolution converting portion 1701 of the filtering processing portion 408. After the resolution converting portion 1701 lowers (degrades) the resolution, for example, from 2,400 dpi to 1,200 dpi, the filtering processing portion 408 corrects the multi-value pixel data to correct the misregistration at the joint corresponding to less than one pixel (21.16 µm). The memory 1703 stores in advance positions of the joints and filter coefficients for correcting the misregistration at the joints (units of µm) between the surface emitting element array chips which are measured in advance at the respective positions. The filter coefficients are stored as coefficients for correction of a front end (1st to 3rd) and a rear end (for example, 514th to 516th) with respect to one surface emitting element array chip. In the case of the example of FIG. 3A to FIG. 3C, the drive portion 303a drives the surface emitting element array chips 1 to 15, and there are 15 joint positions including the joint portion between the surface emitting element array chip 15 and the surface emitting element array chip 16. Meanwhile, the drive portion 303b drives the surface emitting element array chips 16 to 29, and hence there are 14 joint positions including the joint portion between the surface emitting element array chip 15 and the surface emitting element array chip 16.

The joint positions are measured in a step of inspecting the exposure head 106. Further, the filter coefficients between the individual surface emitting element array chips are calculated based on the joint positions measured in the step of inspecting the exposure head 106. The measurement values of the measured joint positions and the calculated filter coefficients are stored in the memory 1703 via the CPU 400. The filter coefficients are calculated based on the measured mounting information (above-mentioned positions) onto the drive circuit board 202 in the main scanning direction (longitudinal direction) between the surface emitting element array chips. The method of calculating the filter coefficient is described later.

[Joint Correcting Portion]

Figure 17:
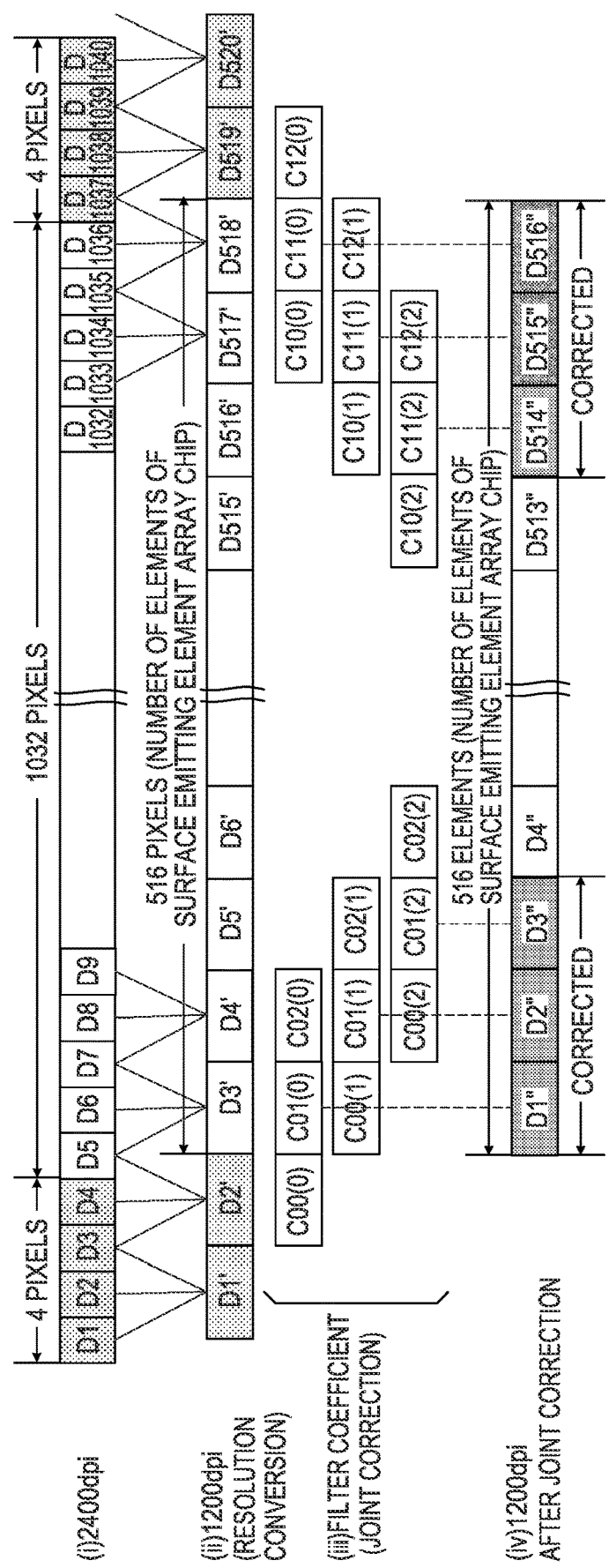
FIG. 17 is a diagram for illustrating an arithmetic operation of the filtering process in the embodiment.

FIG. 17 is a diagram for illustrating a detailed process performed by the joint correcting portion 1702. For simpler description, FIG. 17 shows a process corresponding to one surface emitting element array chip. The target surface emitting element array chip is hereinafter referred to as "surface emitting element array chip N." Further, FIG. 17 shows an example of a case in which the data of the adjacent surface emitting element array chip corresponding to four pixels is added on the front end side, and the data of the adjacent surface emitting element array chip corresponding to four pixels is added on the rear end side. It is assumed that a similar process is performed for each of the surface emitting element array chips. In FIG. 17, part (i) indicates the pixel data at 2,400 dpi before the resolution is converted by the resolution converting portion 1701. The pixel data at the resolution of 2,400 dpi of the surface emitting element array chip N which is currently about to be corrected (serving as a correction target) includes the following data. That is, the pixel data includes four pixels of D1 to D4 corresponding to the pixel data on the rear end side of the surface emitting element array chip N−1, 1,032 pixels of D5 to D1036 of the surface emitting element array chip N, and four pixels of D1037 to D1040 on the front end side of the surface emitting element array chip N+1. Part (ii) indicates the pixel data at 1,200 dpi obtained after the resolution is converted by the resolution converting portion 1701. The pixel data at the resolution of 1,200 dpi of the surface emitting element array chip N includes the following data. That is, the pixel data includes two pixels of D1' and D2' corresponding to the pixel data on the rear end side of the surface emitting element array chip N−1, 516 pixels of D3' to D518' of the surface emitting element array chip N, and two pixels of D519' and D520' on the front end side of the surface emitting element array chip N+1. Part (iii) indicates the filter coefficients (for example, C00(0)) to be used in the joint correction described below. Part (iv) indicates pixel data items D1" to D516" of 516 pixels obtained after the pixel data at the resolution of 1,200 dpi is subjected to the joint correction. The joint correction is performed with respect to the pixels positioned in the vicinity of the joint between the surface emitting element array chips, and hence "CORRECTED" is noted in part (iv) at pixels subjected to the joint correction.

As described above, the resolution converting portion 1701 of the filtering processing portion 408 performs the filtering process for converting the resolution from 2,400 dpi to 1,200 dpi. The filtering process has been already described, and hence description thereof is omitted (conversion from part (i) to part (ii) of FIG. 17). The joint correcting portion 1702 reads out, in response to the instruction from the CPU 400, the information on the position of the joint and the filter coefficient stored in the memory 1703, with respect to the multi-value pixel data whose resolution is converted by the resolution converting portion 1701. In the case of the example illustrated in FIG. 17, the information on the position of the joint of the surface emitting element array chip N stored in the memory 1703 corresponds to D3' and D519'. As described above, as the information on the position of the joint, for example, information related to the luminous point in the surface emitting element array chip (1st, 516th) is stored in the memory 1703. Then, the joint correcting portion 1702 performs the filtering arithmetic operation across a plurality of light emitting elements arranged in the vicinity of the joint, that is, across a predetermined range (for example, three-pixel range) with respect to the position (D3', D519') of the joint of the surface emitting element array chip N serving as a starting point. When such a filtering process is performed, the density centroid in the main scanning direction can be shifted. Further, the filter coefficient used in the filtering process includes a coefficient for absorbing the density difference between the pixels.

[Front End Portion Filtering Process]

In the following, the position of the joint is represented by "n". The joint correcting portion 1702 performs the filtering process with respect to the pixel data (in this case, D3') of the pixel positioned at the joint with reference to the position n=D3' of the joint stored in the memory 1703. The filtering process is started from D3', transitions to the next pixel (that is, incremented by 1) every time the correcting process ends for each pixel, and is performed until the process ends for the pixels in the predetermined range (X). In this embodiment, the predetermined range is set to X=3. The value of X is set by the instruction from the CPU 400.

It is assumed that, for example, under a condition of c>a at the joint portion A illustrated in FIG. 15, the mounting distance in the main scanning direction between the surface emitting element array chips measured in the inspection step is 10.5 μm. In this case, for example, as the filter coefficients, the following values are stored in the memory 1703.

$$C00(0): 0.5, C01(0): 0.5, C02(0): 0$$

Further, the joint correcting portion 1702 calculates the filter coefficients to be used for other pixels as follows based on C00(0), C01(0), and C02(0) stored in the memory 1703.

The size of one pixel at 1,200 dpi is 21.16 μm. Accordingly, in order to correct the mounting distance of 10.5 μm in the main scanning direction between the surface emitting element array chips, the position is required to be shifted by 0.5 pixels (about half a pixel). The mounting distance of 10.5 μm is also a correction amount in which correction is required. As illustrated in part (iii) of FIG. 17, the filter coefficients used when the filtering process is performed with respect to the pixel D3' are as follows. The filter coefficient with respect to the pixel D3' is C01(0), the filter coefficient with respect to the pixel D2' adjacent to the pixel D3' is C00(0), and the filter coefficient with respect to the pixel D4' adjacent to the pixel D3' is C02(0). The filter coefficients used when the filtering process is performed with respect to the pixel D4' are as follows. The filter coefficient with respect to the pixel D4' is C01(1), the filter coefficient with respect to the pixel D3' adjacent to the pixel D4' is C00(1), and the filter coefficient with respect to the pixel D5' adjacent to the pixel D4' is C02(1). The filter coefficients used when the filtering process is performed with respect to the pixel D5' are as follows. The filter coefficient with respect to the pixel D5' is C01(2), the filter coefficient with respect to the pixel D4' adjacent to the pixel D5' is C00(2), and the filter coefficient with respect to the pixel D6' adjacent to the pixel D5' is C02(2). With respect to the pixel that is now of interest (hereinafter referred to as "pixel of interest"), the filter coefficient of the adjacent pixel in the direction in which correction is required is calculated from the size of (correction amount)/(one pixel). In this case, the filter coefficient is C00(0) or the like, the correction amount is the mounting distance of 10.5 μm, and the size of one pixel is 21.16 μm.

The filter coefficient C01(0) of the pixel of interest (for example, pixel D3') is obtained as follows.

$$1 - [(\text{Correction amount } (10.5 \, \mu m))/(\text{Size of one pixel } (21.16 \, \mu m))]$$

C02(0) is not used, and hence is 0.

In the filtering process of the front end portion of the surface emitting element array chip N, the filter coefficients are computed inside such that the correction amount is gradually reduced within the predetermined range (D3' to D3'+X).

For example, in FIG. 17, when the predetermined range is X=3 and the filter coefficients stored in the memory 1703 are C00(0)=0.5, C01(0)=0.5, and C02(0)=0, C00(1) to C02(1) and C00(2) to C02(2) are computed as follows.

$$C00(1)=0.33, C01(1)=0.67, C02(1)=0$$

$$C00(2)=0.17, C01(2)=0.83, C02(2)=0$$

The arithmetic operation of the filter coefficients computed by the joint correcting portion 1702 can be expressed by the following general expressions.

$$C00(i) = C00(0)/X \times (X-i) \quad \text{(Expression 5-1)}$$

$$C01(i) = C01(0) + i \times (C00(0)/X + C02(0)/X) \quad \text{(Expression 5-2)}$$

$$C02(i) = C02(0)/X \times (X-i) \quad \text{(Expression 5-3)}$$

In this case, "i" represents a value to be incremented every time the filtering process is performed from the joint position, and $0 \leq i < X$ is satisfied. In the case of X=3, "i" is 0, 1, and 2. Specifically, in the case of D3', i=0 is set, and, in the case of D4', i=1 is set. Further, in the case of D5', i=2 is set. When X=0 is set for the predetermined range, the arithmetic operation of the filter coefficient and the filtering process are not performed.

The joint correcting portion 1702 performs the arithmetic operation of the filtering process based on Expression 6 given below.

$$D(n-2)'' = D(n-1)' \times C00(m) + D(n)' \times C01(m) + D(n+1)' \times C02(m) \quad \text{(Expression 6)}$$

The ranges of "n" and "m" are set as 3≤n<3+X, 0≤m<X, and 1≤X<11. For example, in the case of the predetermined range of X=3, "n" is 3, 4, and 5, and "m" is 0, 1, and 2. That is, "n" corresponds to the pixel numbers of D3', D4', and D5' corresponding to the luminous points positioned at the front end in the surface emitting element array chip N. Further, "m" is a numerical value in parentheses of the filter coefficient.

Expression 6 can be specifically expressed as follows with reference to parts (ii) to (iv) of FIG. 17. First, D1" of n=3 after the joint correction is m=0, and is expressed as follows.

$$D1''=D2'\times C00(0)+D3'\times C01(0)+D4'\times C02(0)$$

Further, D2" of n=4 and m=1 and D3" of n=5 and m=2 are expressed as follows.

$$D2''=D3'\times C00(1)+D4'\times C01(1)+D5'\times C02(1)$$

$$D3''=D4'\times C00(2)+D5'\times C01(2)+D6'\times C02(2)$$

As described above, through the filtering process performed by the joint correcting portion 1702, the value of the pixel data at the joint between the surface emitting element array chips is increased or decreased. As a result, the centroid of the image data can be moved by an amount attenuated from 10.5 μm with respect to the pixels within the predetermined range from the joint position, and thus smooth joint correction is allowed. For example, at the joint portion A of FIG. 15, an image without a black streak can be obtained through the joint correction performed by the joint correcting portion 1702.

[Rear End Portion Filtering Process]

The joint correcting portion 1702 performs the filtering process with respect to the pixel data (in this case of X=3, D516') of the pixel positioned at the joint with reference to the position n=D519'−X of the joint stored in the memory 1703. The filtering process is started from D519'−X, transitions to the next pixel (that is, incremented by 1) every time the correcting process ends for each pixel, and is performed until the process ends for the pixels in the predetermined range (D518'). In this embodiment, the predetermined range is set to X=3. The value of X is set by the instruction from the CPU 400.

For example, also with regard to the joint portion B illustrated in FIG. 15, it is assumed that, under the condition of c>a in which a black streak is formed, the mounting position in the main scanning direction between the surface emitting element array chips measured in the inspection step is 10.5 μm. That is, the joint portion B of FIG. 15 is described below assuming that a black streak is formed as well. In this case, for example, as the filter coefficients, the following values are stored in the memory 1703.

$$C10(0): 0, C11(0): 0.5, C12(0): 0.5$$

Further, the joint correcting portion 1702 calculates the filter coefficients used for other pixels based on C10(0), C11(0), and C12(0) stored in the memory 1703. The calculation method is omitted because the method is similar to the method described in the filtering process at the front end portion, and differs only in pixels adjacent to the pixel of interest in the direction in which correction is required.

In the filtering process of the rear end portion of the surface emitting element array chip N, the filter coefficients are computed inside such that the correction amount is gradually increased within the predetermined range (D519' to D518').

For example, in FIG. 17, when the predetermined range is X=3 and the filter coefficients stored in the memory 1703 are C10(0)=0, C11(0)=0.5, and C12(0)=0.5, C10(1) to C12(1) and C10(2) to C12(2) are computed as follows.

$$C10(1)=0, C11(1)=0.67, C12(1)=0.33$$

$$C10(2)=0, C11(2)=0.83, C12(2)=0.17$$

The arithmetic operation of the filter coefficients computed by the joint correcting portion 1702 can be expressed by the following general expressions.

$$C10(i)=C10(0)/X\times(X-i) \quad \text{(Expression 7-1)}$$

$$C11(i)=C11(0)+i\times(C10(0)/X+C12(0)/X) \quad \text{(Expression 7-2)}$$

$$C12(i)=C12(0)/X\times(X-i) \quad \text{(Expression 7-3)}$$

In this case, "i" represents a value to be incremented every time the filtering process is performed from the joint position, and 0≤i<X is satisfied. In the case of X=3, "i" is 0, 1, and 2. When X=0 is set for the predetermined range, the arithmetic operation of the filter coefficient and the filtering process are not performed.

The joint correcting portion 1702 performs the arithmetic operation of the filtering process based on Expression 6 given above. The ranges of "n" and "m" are set as 519−X≤n<519, 0≤m<X, and 1≤X<11. For example, in the case of the predetermined range of X=3, "n" is 516, 517, and 518, and "m" is 0, 1, and 2. That is, "n" corresponds to the pixel numbers of D516', D517', and D518' corresponding to the luminous points positioned at the front end in the surface emitting element array chip N. Further, "m" is a numerical value in parentheses of the filter coefficient, and is in the order of 2, 1, and 0 which is opposite to that in the case of the front end.

Expression 6 can be specifically expressed as follows with reference to parts (ii) to (iv) of FIG. 17. First, D514" of n=517 and m=1 and D516" of n=518 and m=0 are expressed as follows.

$$D514''=D515'\times C10(2)+D516'\times C11(2)+D517'\times C12(2)$$

Further, D515" of n=517 and m=1 and D516" of n=518 and m=0 are expressed as follows.

$$D515''=D516'\times C10(1)+D517'\times C11(1)+D518'\times C12(1)$$

$$D516''=D517'\times C10(0)+D518'\times C11(0)+D519'\times C12(0)$$

As described above, through the filtering process performed by the joint correcting portion 1702, the value of the pixel data at the joint between the surface emitting element array chips is increased or decreased. As a result, the centroid of the image data can be moved by an amount attenuated from 10.5 μm with respect to the pixels within the predetermined range from the joint position, and thus smooth joint correction is allowed.

With the above-mentioned arithmetic operation, correction of the misregistration at the position of the joint at each of the front end and the rear end is performed with respect to a predetermined surface emitting element array chip. In FIG. 17, as an example, the size of the filter coefficient is set to 1×3, but the size of the filter coefficient is not limited thereto. However, when the size of the filter coefficient is increased, it is required to increase the number of pixels to be added of the adjacent surface emitting element array chips. Further, the processing range is set to 3 pixels (X=3), but the processing range is not limited to 3 pixels, and the number of pixels of the processing range is determined by the instruction from the CPU 400. Further, in the example of the above-mentioned filtering process, the joint correction under the condition of c>a (formation of black streak) is described, but in the case of the condition of c<b (formation of white streak), it is assumed that the memory 1703 stores filter coefficients in which right and left values thereof are exchanged for pixels adjacent to the pixel of interest. For example, in the case of c<b, for the front end portion of the surface emitting element array chip, the memory 1703 stores the filter coefficients of C00(0)=0, C01(0)=0.5, and C02(0)=0.5. For example, in the case of c<b, for the rear end portion of the surface emitting element array chip, the memory 1703 stores the filter coefficients of C10(0)=0.5, C11(0)=0.5, and C12(0)=0.

As described above, in this embodiment, the image data at 2,400 dpi is converted by the resolution converting portion 1701 to have a lower resolution, and then the joint correction is performed by the joint correcting portion 1702. Accordingly, the reduction in accuracy at the joint correction position due to the image deterioration caused by the resolution converting process can be prevented. Further, in this embodiment, with the resolution converting process, the image data is converted into multi-value data at 1,200 dpi which appears to have an accuracy at 2,400 dpi. This multi-value data is subjected to the joint correcting process, and hence high-accuracy joint correction with less image deterioration is allowed.

In FIG. 4, the CPU 400, the integrated circuit 401A, and the integrated circuit 402A may be included on one integrated circuit. Alternatively, the CPU 400 may be an integrated circuit different from the integrated circuit 401A and the integrated circuit 402A.

Modification Examples of FIG. 4

Figure 18:
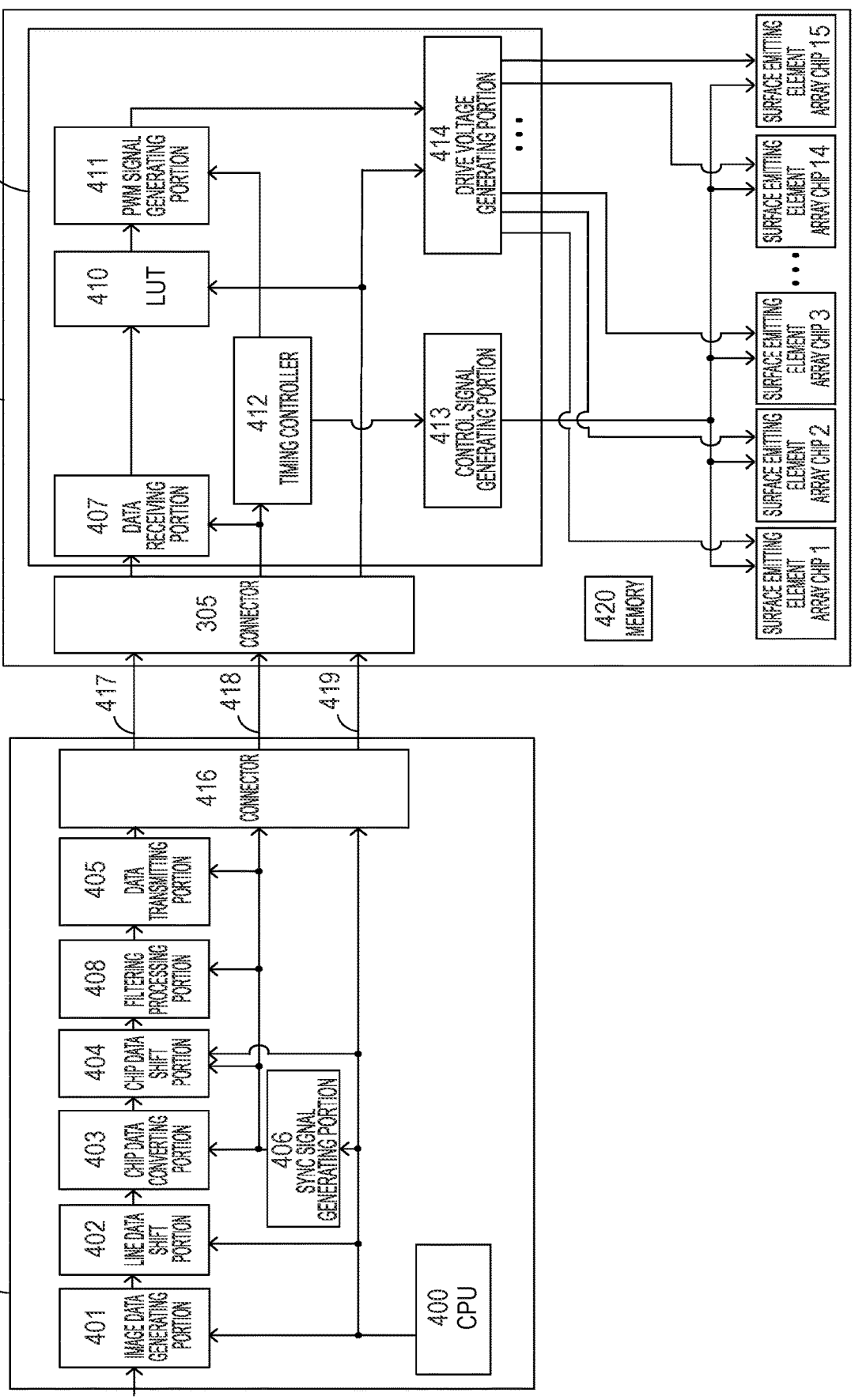
FIG. 18 is a block diagram for illustrating another embodiment.

As Modification Example 1 of FIG. 4, for example, as illustrated in FIG. 18, the filtering processing portion 408 may be provided between the chip data shift portion 404 and the data transmitting portion 405.

Figure 19:
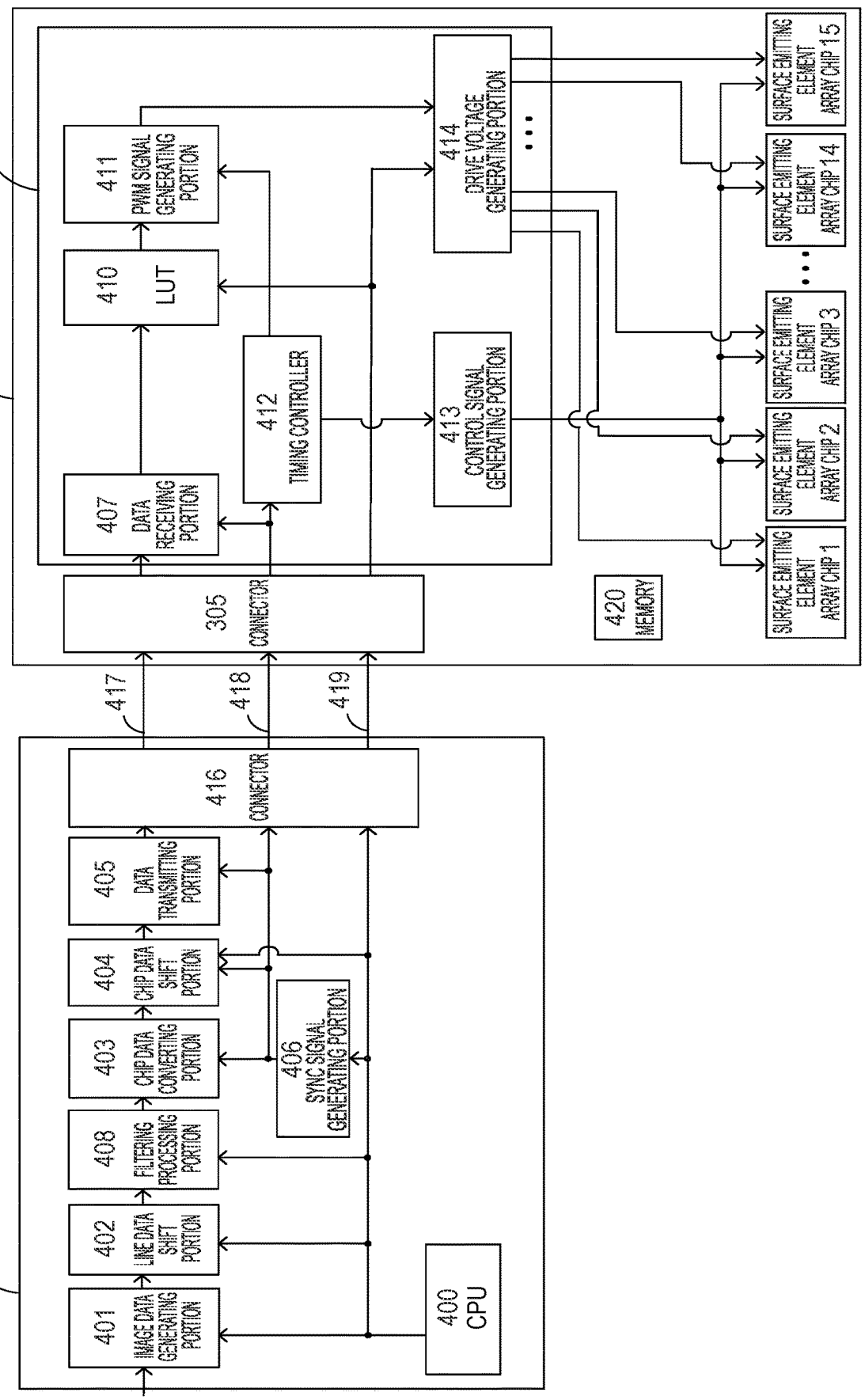
FIG. 19 is a block diagram for illustrating another embodiment.

As Modification Example 2 of FIG. 4, for example, as illustrated in FIG. 19, the filtering processing portion 408 may be provided between the line data shift portion 402 and the chip data converting portion 403.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

As described above, the present invention enables high-quality image formation regardless of an accuracy of mounting the surface emitting element array chips.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
 a photosensitive member to be driven to rotate;
 an exposure head including:
  a first chip including a plurality of light emitting elements configured to expose the photosensitive member;
  a second chip including a plurality of light emitting elements configured to expose the photosensitive member; and
  a circuit board on which the first chip and the second chip are arrayed at positions different from each other in an intersecting direction intersecting with a rotation direction of the photosensitive member, the first chip and the second chip being arrayed at positions different from each other in the rotation direction and arranged adjacent to each other in the intersecting direction so as to have an overlapping portion at end portions thereof, the image forming apparatus being configured to form an image at a first resolution corresponding to an array interval of the plurality of light emitting elements in the intersecting direction;
 a data generating unit configured to generate, based on input image data, pixel data corresponding to to a second resolution higher than the first resolution;
 a conversion unit configured to convert pixel data equivalent to the second resolution generated by the data generating unit into pixel data equivalent to the first resolution; and
 a correction unit configured to correct image data corresponding to the first resolution after converting, to suppress a misregistration amount with respect to the array interval equivalent to the first resolution at the overlapping portion between the first chip and the second chip in the intersecting direction.

2. The image forming apparatus according to claim 1,
 wherein the misregistration amount is a misregistration amount less than the array interval equivalent to the first resolution, and
 wherein the correction unit is configured to correct the pixel data through use of a filter coefficient which allows a centroid of a density corresponding to a plurality of light emitting elements arranged in a vicinity of the overlapping portion to be shifted in the intersecting direction so as to correct the pixel data.

3. The image forming apparatus according to claim 2, wherein the correction unit is configured to determine the filter coefficient based on the misregistration amount and the array interval.

4. The image forming apparatus according to claim 1, further comprising a second correction unit configured to correct a color misregistration in the rotation direction and a color misregistration in the intersecting direction of items of the pixel data of the pixels equivalent to the second resolution, which are generated by the data generating unit, and to correct a misregistration in the intersecting direction of the plurality of light emitting elements, wherein the conversion unit is configured to perform an interpolating process of obtaining a density of a pixel after conversion based on a density of a pixel before conversion and a density of a pixel adjacent to the pixel before conversion, to thereby convert the resolution of the pixel data items in the intersecting direction corrected by the second correction unit, from the pixel data items of the pixels equivalent to the second resolution into pixel data items of pixels equivalent to the first resolution, and wherein the conversion unit is configured to, when performing the interpolating process, perform the interpolating process based on a density of a pixel at an end portion of a chip of one of the first chip and the second chip adjacent to an end portion side of the chip.

5. The image forming apparatus according to claim 4, wherein the conversion unit is configured to obtain the pixel data items of the pixels equivalent to the first resolution after the conversion based on a value obtained by multiplying pixel data of the pixel equivalent to the second resolution before the conversion by a first coefficient, and on a value obtained by multiplying pixel data of the pixel adjacent to the pixel equivalent to the second resolution by a second coefficient.

6. The image forming apparatus according to claim 5, wherein the conversion unit is configured to switch between a first process of obtaining the pixel data items of the pixels equivalent to the first resolution after the conversion through interpolation of the pixel data of the pixel adjacent to the pixel before the conversion, and a second process of obtaining the pixel data items of the pixels equivalent to the first resolution after the conversion without performing the interpolation of the pixel data of the pixel adjacent to the pixel before the conversion, and wherein the conversion unit is configured to switch settings of the first coefficient and the second coefficient to switch to one of the first process and the second process.

7. The image forming apparatus according to claim 6, wherein the first coefficient in the second process is greater than the first coefficient in the first process, and wherein the second coefficient in the second process is less than the second coefficient in the first process.

8. The image forming apparatus according to claim 7, wherein a sum of the first coefficient and two second coefficients is 1.

9. The image forming apparatus according to claim 8, wherein the first chip and the second chip include light emitting elements corresponding to pixels equivalent to the first resolution, and wherein, in the first process, pixel data of a pixel of a light emitting element at the end portion of a chip of one of the first chip and the second chip is interpolated by pixel data of a pixel of a light emitting element at an end portion of a chip of one of the first chip and the second chip adjacent to the light emitting element at the end portion of the chip.

10. The image forming apparatus according to claim 4, wherein the exposure head is configured to perform exposure in the rotation direction of the photosensitive member based on the pixel data items of the pixels equivalent to the second resolution, and to perform exposure in the intersecting direction of the photosensitive member based on the pixel data items of the pixels equivalent to the first resolution.

11. The image forming apparatus according to claim 10, further comprising a sensing unit configured to sense a color misregistration amount in the rotation direction and a color misregistration amount in the intersecting direction of an image to be formed on the photosensitive member by the exposure head, wherein the second correction unit is configured to correct color misregistration in the rotation direction and color misregistration in the intersecting direction of the pixel data items generated by the data generating unit based on the color misregistration amount in the rotation direction and the color misregistration amount in the intersecting direction which are sensed by the sensing unit.

12. The image forming apparatus according to claim 11, further comprising a storage unit configured to store a misregistration amount of the first chip and the second chip in the intersecting direction, wherein the second correction unit is configured to correct the pixel data items subjected to correction of the color misregistration in the rotation direction and the color misregistration in the intersecting direction, based on the misregistration amount stored in the storage unit.

13. The image forming apparatus according to claim 12, wherein the first chip and the second chip are arranged in two rows in the rotation direction, and wherein an interval in the rotation direction of the plurality of light emitting elements arranged in each of the two rows is an integral multiple of an interval equivalent to the second resolution.

* * * * *